United States Patent
Lee et al.

(10) Patent No.: US 9,883,384 B2
(45) Date of Patent: Jan. 30, 2018

(54) UE-BASED NETWORK SUBSCRIPTION MANAGEMENT

(71) Applicant: QUALCOMM Incorporated, San Diego, CA (US)

(72) Inventors: Soo Bum Lee, San Diego, CA (US); Gavin Bernard Horn, La Jolla, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/596,953

(22) Filed: Jan. 14, 2015

(65) Prior Publication Data

US 2016/0021635 A1    Jan. 21, 2016

Related U.S. Application Data

(60) Provisional application No. 62/025,398, filed on Jul. 16, 2014, provisional application No. 62/025,777, filed on Jul. 17, 2014.

(51) Int. Cl.
*H04W 12/04* (2009.01)
*H04W 12/06* (2009.01)
(Continued)

(52) U.S. Cl.
CPC .......... *H04W 12/04* (2013.01); *H04L 63/0853* (2013.01); *H04L 63/18* (2013.01);
(Continued)

(58) Field of Classification Search
CPC ....... H04W 60/04; H04W 12/06; H04W 8/12; H04W 64/00; H04W 60/00; H04W 24/00;
(Continued)

(56) References Cited

U.S. PATENT DOCUMENTS

| 8,103,871 B2 | 1/2012 | Deligne et al. |
| 9,628,485 B2 * | 4/2017 | Chakraborty ....... H04W 76/023 |

(Continued)

FOREIGN PATENT DOCUMENTS

| EP | 2741459 A1 * | 6/2014 |
| EP | 2741459 A1 | 6/2014 |

(Continued)

OTHER PUBLICATIONS

Anonymous, "Network Switching Subsystem," Wikipedia, the free encyclopedia, Jun. 24, 2014, XP055216255, 8 pgs., retrieved from the Internet: URL: https://en.wikipedia.org/w/index.php?title=Network_switching_subsystem&oldid=614168688 [retrieved on Sep. 25, 2015].

(Continued)

*Primary Examiner* — Hirdepal Singh
(74) *Attorney, Agent, or Firm* — Holland & Hart LLP

(57) ABSTRACT

Methods, systems, and devices for wireless communication are described. A user equipment (UE) may obtain identification information for a device and may assist in establishing credentials by which the device accesses a wireless network. The UE may establish a connection with the wireless network using its own credentials, and register the device to access the wireless network by associating the identification information for the device with the credentials of the UE. The UE may receive or establish credentials by which the device accesses the wireless network and may communicate these credentials to the device over a local connection. In some cases, the UE may authenticate the device's identification information to determine whether the device is allowed to be registered with the wireless network.

65 Claims, 12 Drawing Sheets

(51) Int. Cl.
*H04W 4/00* (2009.01)
*H04W 8/04* (2009.01)
*H04W 48/02* (2009.01)
*H04W 60/00* (2009.01)
*H04W 76/02* (2009.01)
*H04W 12/08* (2009.01)
*H04W 8/18* (2009.01)
*H04L 29/06* (2006.01)
*H04W 8/20* (2009.01)

(52) U.S. Cl.
CPC ............. *H04W 4/005* (2013.01); *H04W 8/04* (2013.01); *H04W 8/18* (2013.01); *H04W 12/06* (2013.01); *H04W 12/08* (2013.01); *H04W 48/02* (2013.01); *H04W 60/00* (2013.01); *H04W 76/023* (2013.01); *H04W 8/205* (2013.01)

(58) Field of Classification Search
CPC ..... H04W 48/18; H04W 88/14; H04W 88/18; H04W 8/02; H04W 8/04; H04W 8/08; H04W 12/08; H04W 36/0022; H04W 84/0454; H04W 12/04; H04W 48/02; H04W 4/005; H04W 76/023; H04W 8/18; H04W 8/205
USPC .......................................................... 455/411
See application file for complete search history.

(56) References Cited

U.S. PATENT DOCUMENTS

| | | |
|---|---|---|
| 2003/0120920 A1 | 6/2003 | Svensson |
| 2010/0269156 A1 | 10/2010 | Hohlfeld et al. |
| 2012/0266217 A1 | 10/2012 | Kaal et al. |
| 2013/0099892 A1 | 4/2013 | Tucker et al. |
| 2013/0109355 A1* | 5/2013 | Cope .................... H04L 63/0884 455/411 |
| 2013/0115915 A1 | 5/2013 | Tipton et al. |
| 2013/0227656 A1 | 8/2013 | Holtmanns et al. |
| 2013/0247161 A1* | 9/2013 | Bajko .................. H04L 9/3268 726/7 |
| 2014/0066013 A1 | 3/2014 | Macarenhas et al. |
| 2014/0171027 A1* | 6/2014 | Arkko ................. H04L 63/0853 455/411 |
| 2015/0128230 A1 | 5/2015 | Chang et al. |
| 2015/0229639 A1* | 8/2015 | Abdulrahiman .... H04L 63/0853 455/411 |
| 2015/0280994 A1* | 10/2015 | Kim ..................... H04L 61/103 709/223 |
| 2016/0014601 A1* | 1/2016 | Mellqvist .............. H04W 12/06 455/411 |
| 2016/0021691 A1 | 1/2016 | Lee et al. |
| 2016/0261757 A1* | 9/2016 | Rajadurai ............. H04M 15/61 |
| 2017/0054564 A1* | 2/2017 | Bone ................... H04L 63/0272 |

FOREIGN PATENT DOCUMENTS

| | | |
|---|---|---|
| JP | 2008252787 A | 10/2008 |
| WO | WO-2014094835 A1 | 6/2014 |

OTHER PUBLICATIONS

ISA/EPO, International Search Report and Written Opinion of the International Searching Authority, Int'l. App. No. PCT/US2015/039195, dated Oct. 9, 2015, European Patent Office, Rijswijk, NL, 12 pgs.

IPEA/EP, Second Written Opinion of the International Preliminary Examining Authority, Int'l. App. No. PCT/US2015/039195, Jul. 28, 2016, European Patent Office, Munich, DE, 6 pgs.

\* cited by examiner

UE-BASED NETWORK SUBSCRIPTION MANAGEMENT

CROSS REFERENCES

The present application for patent claims priority to U.S. Provisional Patent Application No. 62/025,398 by Lee et al., entitled "UE-Based Network Subscription Management," filed Jul. 16, 2014, and to U.S. Provisional Patent Application No. 62/025,777 by Lee et al., entitled "Associating a Device with Another Device's Network Subscription," filed Jul. 17, 2014, which are each assigned to the assignee hereof, and expressly incorporated by reference herein.

BACKGROUND

The following relates generally to wireless communication, and more specifically to associating a device with another device's network subscription. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, e.g., a Long Term Evolution (LTE) system.

Generally, a wireless multiple-access communications system may include a number of base stations, each simultaneously supporting communication for multiple mobile devices or other user equipment (UE) devices. Base stations may communicate with UEs on downstream and upstream links. Each base station has a coverage range, which may be referred to as the coverage area of the cell. Some types of wireless devices may provide for automated communication. Some wireless devices may implement Machine-to-Machine (M2M) communication or Machine Type Communication (MTC). M2M and/or MTC may refer to data communication technologies that allow devices to communicate with one another or a base station without human intervention. For example, M2M and/or MTC may refer to communications from devices that integrate sensors or meters to measure or capture information and relay that information to a central server or application program that can make use of the information or present the information to humans interacting with the program or application.

In some cases, an MTC device or a UE may lack credentials for accessing a wireless network or it may lack the hardware necessary to support a particular access procedure. For example, an MTC device may not have a smart card or a Universal Integrated Circuit Card (UICC).

SUMMARY

The described features generally relate to one or more improved systems, methods, and/or apparatuses for associating a device with another device's network subscription. A user equipment (UE) may obtain identification information for a device and may assist in establishing credentials by which the device accesses a wireless network. For example, the device may lack a smart card or UICC that stores credentials for accessing a cellular network. To help the device gain access, the UE may establish a connection with the wireless network using its own credentials, and register the device to access the wireless network with a network credential for the device that is different from the UE's own credentials. The registration may include associating the identification information for the device with the credentials of the UE. The UE may then receive or establish credentials for the device to access the wireless network and may provide those the credentials to the device over a local connection. In some cases, the UE may authenticate the device's identification information to determine whether the device is allowed to be registered with the wireless network.

A method of wireless communication performed by a UE is described. The method may include obtaining identification information for a device, establishing a connection with a wireless network based on a network credential of the UE, and registering the device for access the wireless network for the device that is different from the network the network credential of the UE, where the registration may include associating the identification information for the device with the network credential of the UE.

An apparatus for wireless communication is described. The apparatus may be a UE or a component of a UE, as described herein. The apparatus may include means for obtaining identification information for a device, means for establishing a connection with a wireless network based on a network credential of the apparatus, and means for registering the device that is different from the network credential of the apparatus, where the registration may include associating the identification information for the device with the network credential of the apparatus.

A further apparatus for wireless communication is described. The apparatus may be a UE or a component of a UE, as described herein. The apparatus may include at least one processor, memory in electronic communication with the at least one processor, and instructions stored in the memory. The instructions may be operable, when executed by the at least one processor, to cause the apparatus to obtain identification information for a device, establish a connection with a wireless network based on a network credential of the apparatus, and register the device for access to the wireless network with a network credential that is different from the network credential of the apparatus by associating the identification information for the device with the network credential of the apparatus.

A non-transitory computer-readable medium storing code for wireless communication is also described. The code may include instructions executable to obtain identification information for a device, establish a connection with a wireless network based on a network credential of a UE, and register the device for access to the wireless network with a network credential that is different from the network credential of the UE, by associating the identification information for the device with the network credential of the UE.

Some examples of the methods, apparatuses, or computer-readable media described herein may include processes, features, means, or instructions for establishing a local communication link with the device, and the identification information for the device may be obtained over the local communication link. Some examples may additionally or alternatively include processes, features, means, or instructions for sending the network credential for the device over the local communication link.

In some examples of the methods, apparatuses, or computer-readable media described herein, the network credential for the device includes at least one of: a subscription identity associated with the network credential of the UE or apparatus, or a network identifier, or any combination thereof. In some examples, the subscription identity includes at least one of: a globally unique temporary identity (GUTI) or an international mobile subscriber identity (IMSI) of the UE or apparatus, or any combination thereof, and the network identifier may include at least one of: a public key certificate of the network, a public key of the network, or a public land mobile network (PLMN) identity, or any combination thereof. Additionally or alternatively, in some examples, the network credential for the device includes at least one of: a shared key provisioned by a device manufacturer or a private-public key pair provisioned by a device manufacturer, or any combination thereof.

Some examples the methods, apparatuses, or computer-readable media described herein may include processes, features, means, or instructions for authenticating the identification information for the device by the UE or apparatus, and determining whether the device is allowed to be registered with the wireless network. Additionally or alternatively, some examples may include processes, features, means, or instructions for sending an authentication request to a device authentication server. Some examples, may also include processes, features, means, or instructions for receiving an authentication response from the device authentication server, and authenticating the identification information for the device may be based on the authentication response.

Some examples the methods, apparatuses, or computer-readable media described herein may include processes, features, means, or instructions for sending the identification information to a home subscriber server (HSS) of the UE or apparatus via the connection with the wireless network. In some examples, obtaining the identification information for the device may include at least one of: scanning a Quick Response (QR) code, utilizing a wireless personal area network (WPAN) connection, utilizing a universal serial bus (USB) link, utilizing a near field communication (NFC) link, utilizing a Wireless Local Area Network (WLAN) link, or accessing a uniform resource locator (URL), or any combination thereof and some examples of the methods, apparatuses, or computer-readable media described herein may include processes, features, means, or instructions for or operative to effect the same. Additionally or alternatively, in some examples, the identification information for the device includes at least one of: a device identifier, device parameters, a URL, a shared key of the device, a public key of the device, or a public key certificate of the device, or any combination thereof.

Some examples the methods, apparatuses, or computer-readable media described herein may include processes, features, means, or instructions for providing the wireless network with access restrictions for the device. In some examples, the access restrictions may include at least one of: access time duration limits, time of use specifications, maximum bandwidth limits, service parameters, uplink throughput limits, or downlink throughput limits, or any combination thereof.

In some examples, registering the device may include sending a registration request for the device to the wireless network via the connection; and some examples the methods, apparatuses, or computer-readable media described herein may include processes, features, means, or instructions for or operative to effect the same. Additionally or alternatively, some examples the methods, apparatuses, or computer-readable media described herein may include processes, features, means, or instructions for receiving a registration acknowledgment responsive to the registration request from the wireless network via the connection.

In some examples of the methods, apparatuses, or computer-readable media described herein, the identification information for the device is of a different kind than the network credential of the UE or apparatus. In some examples, the network credential of the UE is maintained in a universal integrated circuit card (UICC) of the UE or apparatus or based on information obtained from a subscriber identity module (SIM) of the UE or apparatus. Additionally or alternatively, network credential of the UE or apparatus may be provisioned by an operator of the wireless network and the identification information for the device is established by a manufacturer of the device.

A further method for wireless communication is described. The method may include establishing a connection with a UE over a local communication link, receiving credentials for accessing a wireless network from the UE over the local communication link, where the credentials for accessing the wireless network are different from a network credential of the UE, and accessing the wireless network utilizing the received credentials.

A further apparatus for wireless communication is described. The apparatus may be a device or a component of a device, as described herein. The apparatus may include means for establishing a connection with a UE over a local communication link, means for receiving credentials for accessing a wireless network from the UE over the local communication link, where the credentials for accessing the wireless network are different from a network credential of the UE, and means for accessing the wireless network utilizing the received credentials.

A further apparatus for wireless communication is described. The apparatus may be a device or a component of a device, as described herein. The apparatus may include at least one processor, memory in electronic communication with the at least one processor, and instructions stored in the memory. The instructions may be operable, when executed by the at least one processor, to cause the apparatus to establish a connection with a UE over a local communication link, receive credentials for accessing a wireless network from the UE over the local communication link, where the credentials for accessing the wireless network are different from a network credential of the UE, and access the wireless network utilizing the received credentials.

A further non-transitory computer-readable medium storing code for wireless communication is also described. The code may include instructions executable to establish a connection with a UE over a local communication link, receive credentials for accessing the wireless network from the UE over the local communication link, where the credentials for accessing the wireless network are different from a network credential of the UE, and access the wireless network utilizing the received credentials.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A user equipment (UE) may obtain identification information for a device that lacks credentials for accessing a wireless network. For example, the device may lack a smart card or UICC, and may not support over-the-air provisioning procedures for accessing a cellular network. The UE may establish a connection with the wireless network using its own credentials, and register the device to access the wireless network by associating the identification information for the device with the credentials of the UE. The UE may then receive or establish credentials for accessing the wireless network by which the device may obtain service on the wireless network. These credentials may be communicated to the device over a local connection. In some cases, the UE may authenticate the device's identification information to determine that the device is allowed to be registered with the wireless network. By associating the device with the subscriber identity of the UE, the UE may enable the device to access the wireless network without requiring it to have a separate subscription.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
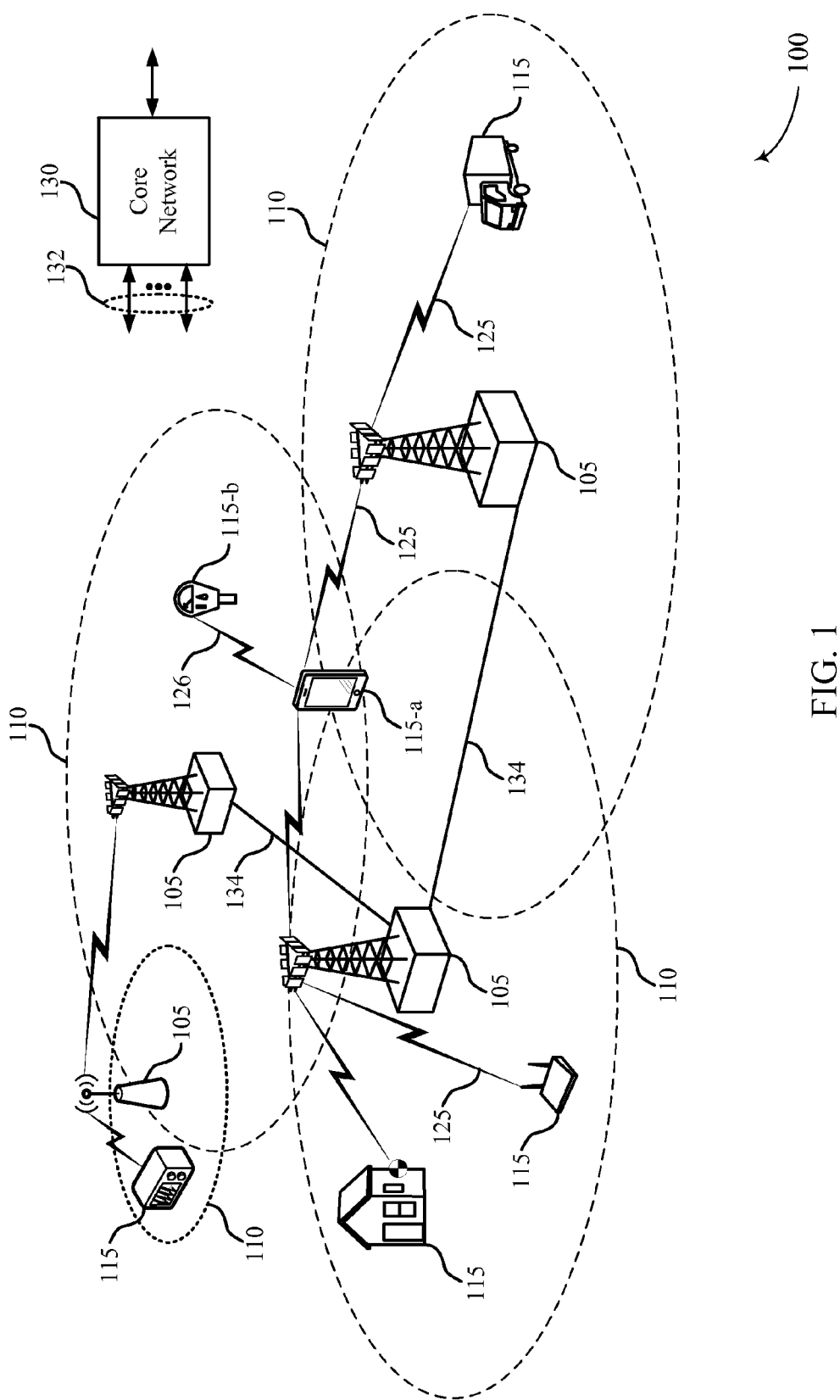
FIG. 1 illustrates an example of a wireless communications system that supports associating a device with another device's network subscription in accordance with the present disclosure.

FIG. 1 illustrates an example of a wireless communications system 100 which supports associating a device with another device's network subscription. The system 100 includes base stations 105, communication devices, also known as a user equipment user equipment (UE) 115, and a core network 130. The base stations 105 may communicate with the UEs 115 under the control of a base station controller (not shown), which may be part of the core network 130 or the base stations 105 in various embodiments. Base stations 105 may communicate control information and/or user data with the core network 130 through backhaul links 132. The core network may verify the access credentials of a UE 115, which may be associated with a subscription identity of the user. The operator of the system 100 may offer subscription-based service such that owners and/or users of UEs 115 (e.g., customers of the operator) may pay a fee for data sent and received via the system 100 utilizing their respective UEs 115. Thus, the operator of the system 100 may require each UE 115 to be associated with a subscription before the UE 115 is authorized to send or receive data via the system 100. The subscription may facilitate tracking of data sent and received via the system 100 so that the operator of the system 100 is able to charge users based on system use. In some cases, this arrangement may be referred to as reverse billing an associated subscription.

In some examples, the base stations 105 may communicate, either directly or indirectly, with each other over backhaul links 134, which may be wired or wireless communication links. The system 100 may support operation on multiple carriers (waveform signals of different frequencies). Wireless communication links 125 may be modulated according to various radio technologies. Each modulated signal may carry control information (e.g., reference signals, control channels, etc.), overhead information, data, etc. A UE may also communicate with other UE's or devices via a local connection 126. For example, a UE may communicate with a device via a local wireless connection (e.g., a wireless local area network (WLAN) or Bluetooth) or via a wired connection.

The base stations 105 may wirelessly communicate with the UEs 115 via one or more base station antennas. Each of the base station 105 sites may provide communication coverage for a respective geographic area 110. In some examples, base stations 105 may be referred to as a base transceiver station, a radio base station, an access point, a radio transceiver, a basic service set (BSS), an extended service set (ESS), a NodeB, evolved node B (eNB), Home NodeB, a Home eNodeB, or some other suitable terminology. The coverage area 110 for a base station may be divided into sectors making up only a portion of the coverage area (not shown. The system 100 may include base stations 105 of different types (e.g., macro, micro, and/or pico base stations). There may be overlapping coverage areas for different technologies.

The system 100 may be a Heterogeneous Long Term Evolution (LTE)/LTE-A network in which different types of base stations provide coverage for various geographical regions. For example, each base station 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell.

The core network 130 may communicate with the base stations 105 via a backhaul 132 (e.g., S1, etc.). The base stations 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The UEs 115 may be dispersed throughout the wireless communications system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

Some UEs 115 may be MTC devices, such as those designed to collect information and communicate without human intervention. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some cases, despite being equipped to operate in the system 100, MTC devices may be configured without a smart card, UICC or other subscriber identity module (SIM)-based credentials. For instance, an MTC device, such as a remote monitoring device, may lack a physical SIM circuit (e.g., a smart card or UICC) or support for over-the-air provisioning.

The communication links 125 shown in system 100 may include uplink (UL) transmissions from a UE 115 to a base station 105, and/or downlink (DL) transmissions, from a base station 105 to a UE 115 over DL carriers. The downlink transmissions may also be called forward link transmissions while the uplink transmissions may also be called reverse link transmissions.

According to the present disclosure, a UE 115-a may obtain identification information for a device 115-b that lacks credentials for accessing the wireless network. As shown, device 115-b is an MTC-capable parking meter which may not have a separate subscription to the wireless network. For example, due to a simplified design, device 115-b may lack hardware support for accessing a cellular network, it may not be provisioned with access credentials by the network operator, etc. As disclosed herein, UE 115-a may establish a connection with the wireless network based on its own network credentials and register device 115-b for service. For example, UE 115-a may associate identification information for device 115-b with its own credentials and may establish credentials for the device 115-b to use to obtain service over the wireless network. The credentials for the device may be different kind than the credentials of the UE. That is, the UE may not share its own network credentials with the device to be added to its subscription list of the UE 115-a but may instead aid the network in establishing credentials that are suitable for the device's particular capabilities. UE 115-a may thus be capable of registering many devices with the wireless network based on its existing subscription and may assist the wireless network with authentication, access restrictions, etc.

Figure 2:
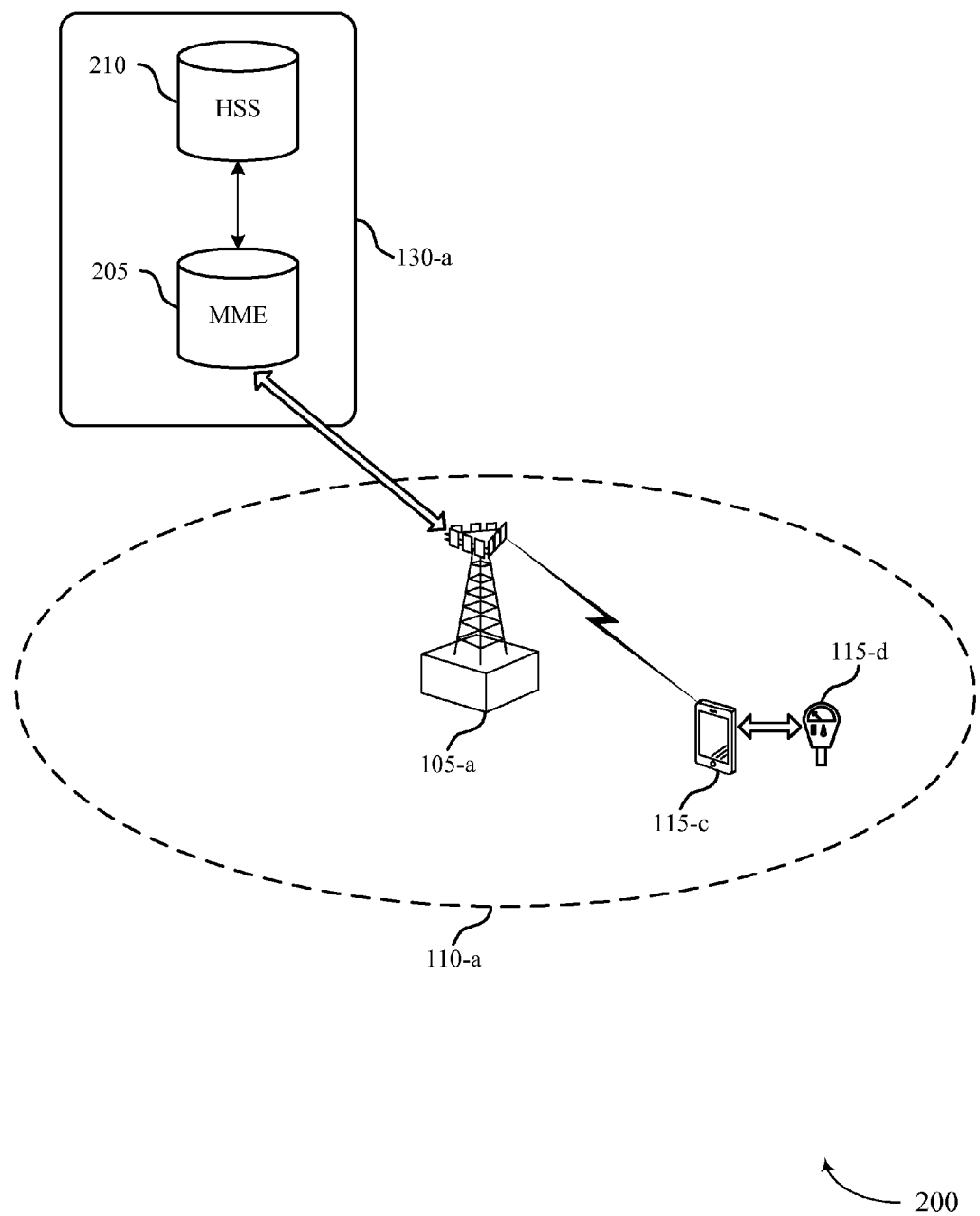
FIG. 2 illustrates additional aspects of a wireless communication system that supports associating a device with another device's network subscription in accordance with the present disclosure.

FIG. 2 illustrates additional aspects of a wireless communications system 200 that supports associating a device with another device's network subscription. The wireless communications system 200 may include a UE 115-c that has access credentials for accessing a wireless network and an a device 115-d (e.g., an MTC device) that lacks credentials for accessing the wireless network. UE 115-c and device 115-d may be examples of UEs and devices 115 described with reference to FIG. 1. System 200 may also include a base station 105-a with coverage area 110-a that may facilitate communication between a core network 130-a and UE 115-c. According to aspects of the present disclosure, after UE 115-c has successfully registered device 115-d, device 115-d may communicate with core network 130-a and obtain service over wireless communications system 200. Core network 130-a may include a mobility management entity (MME) 205 and a home subscriber server (HSS) 210. Base station 105-a and core network 130-a may be examples of the corresponding components of system 100 described with reference to FIG. 1.

By way of example, the device 115-d may be one of several similar devices configured to operate within the systems 100 and 200. For example, the device 115-d may be one of several hundreds (or several thousands) of parking meters operated by a municipality. The municipality may seek to wirelessly monitor and control aspects of parking meter operation within the city. Accordingly, each parking meter may be configured for wireless communications (e.g., MTC communication described above), and the communications systems and circuitry of each parking meter (e.g., device 115-d) may be as simple as possible. For instance, the device 115-d may be equipped with the minimum processing and radio frequency (RF) componentry necessary to facilitate the intermittent communication required by the municipality. Such devices may be described herein as low-cost and/or limited complexity devices. This may allow the municipality to maintain relatively low-cost, low-maintenance, reliably connected devices. The device 115-d may thus be configured without necessary hardware or processing capability to independently establish a subscription to the network 130-a.

Under a subscriber-based network access model, as discussed above, a UE 115 may be required to have credentials to access a network. Often, this may require a specific provisioning procedure for each device. Even with standardized over-the-air (OTA) provisioning, such as embedded SIM (eSIM or virtual SIM) provisioning, the hardware required to implement such procedures may create cost-prohibitive barriers to enabling such low-cost or low-complexity devices to operate on cellular networks. Moreover, even with the added cost of hardware, it may be impractical to require a separate subscription in order for each low-cost device to access the wireless network. Thus, the existing subscription-based service model may be in tension with, and an impediment to, the widespread implementation of low-cost MTC or other reduced complexity devices.

Instead of separate subscriptions or additional device capabilities, the municipality and/or operator of the wireless communications systems 100 and 200 (e.g., cellular service provider) may prefer to associate numerous (or all) parking meters within the city limits with a single subscription maintained by the municipality. For example, the municipality may wish to account and pay for some or all wireless data usage associated with a parking program. It may therefore be desirable to associate parking meters to a single subscription; and the municipality may wish to frequently change the number and identity of devices associated with the subscription. For instance, the municipality may add several new parking meters, or it may decommission several meters, as areas within a parking enforcement zone expand or contract. In order to readily facilitate the addition of new devices to the municipality's subscription, it may be beneficial to allow devices to be associated with the subscription by an employee of the municipality, and without additional coordination by the operator of the systems 100 and 200 (e.g., cellular service provider). For example, an employee may utilize a municipality-issued smartphone (e.g., UE 115-c) to associate parking meters (e.g., device 115-d) as needed.

Those skilled in the art will recognize that aspects of the present disclosure may be beneficial in other scenarios as well. For example, electric, gas, and/or water utilities may frequently add and remove metering equipment within their service territory. Accordingly, device 115-d may be a utility meter that may be associated with a utility's subscription utilizing UE 115-c. That is, a utility employee may associate various meters with a common subscription while servicing utility-owned equipment. In other examples, wildlife monitoring devices (e.g., cameras) may be placed in remote locations; thus, device 115-d may be a wildlife monitoring device that may be associated with an organization's subscription utilizing UE 115-c. For instance, UE 115-c may be a smartphone owned by, and having a subscription registered to the organization, and a volunteer may utilize UE 115-c to associate device 115-d with the organization's subscription.

As another example, a user may purchase a new device 115-d with capabilities for cellular network service and may wish to add the device 115-d to their cellular subscription. To obtain service, the user may registers the device 115-d with the network operator under their own subscription, e.g., under a subscription model where the consumer in the network pays for data sent to/from the device, i.e., reverse billing to an associated subscription. The registration may be enabled in a variety of ways, e.g., the registration may be automated by the user scanning a Quick Response (QR) code on the device 115-d or the device packaging. Alternatively, the user may manually enter the information. This may result in simplified subscription management and billing for the user to enable multiple devices 115. In some cases, a device 115-d may be added without any coordination with the operator except to register the device to a subscription.

MME 205 may be a key network node for exchanging control information with UEs 115. For example, MME 205 may be involved in the network connection activation/deactivation process and may also be involved in authenticating a UE 115 interacting with HSS 210. Non Access Stratum (NAS) signaling—which may be used for the authorization and establishment of communication sessions and for maintaining continuous communications with UEs 115 as they move—may be initiated and/or directed at MME 205. MME 205 may also allocate a temporary identity to UE 115. For example, MME 205 may allocate a globally unique temporary identity (GUTI) to a UE 115 that includes identification information for MME 205 as well as a temporary identity for a UE 115. A GUTI may minimize the frequency with which a persistent identity, e.g., an international mobile subscriber identity (IMSI), is transmitted within the network. MME 205 may also check whether a UE 115 is authorized to camp on a service provider's Public Land Mobile Network (PLMN), and may manage security keys for NAS signaling such as attachment procedures for UEs 115 and handles the security key management.

HSS 210 may be a central database for user and subscription related information. The functions of HSS 210 may include mobility management, call and session establishment support, user authentication and access authorization. HSS 210 may be co-located or in communication with an Authentication Center (AuC), not shown. HSS 210, or another network entity may store a device subscription list, which may be a list of devices 115 and/or groups of devices 115 stored in the network. Each device entry may contain the device IDs and other information associated with the subscriber. For example, the list may include a name for each device 115, which may be an identifier for a device 115 and which may indicate a device type (e.g. device@thermostat). It may also include a device ID, e.g., a globally unique link-layer identifier identifying the device 115 such as an international mobile station equipment identifier (IMEI) an extended unique identifier (EUI), or a MAC address. The list may also include one or more device group IDs, e.g., a globally unique link-layer identity that identifies a group of devices to associate with a subscription. In some cases, a device identifier may also be a Mobile Subscriber Integrated Services Digital Network-Number (MSISDN), or a network access identifier (NAI).

According to aspects of the present disclosure, UE 115-c may establish a connection with a wireless network in part by exchanging its credentials and identity verification information with MME 205 and HSS 210 in core network 130-a. UE 115-c may obtain identification information from device 115-d and register device 115-d with core network 130-a over the connection. Upon successful registration, identification information of device 115-d may be associated with the subscription information of UE 115-c in core network 130-a, so that device 115-d may subsequently access the wireless network, even if device 115-d lacks sufficient credentials to access the wireless network without being associated with the subscription identity of UE 115-c (e.g., even if device 115-d lacks SIM capabilities). In some examples, device 115-d may, after being registered, access the wireless network with limited assistance of UE 115-c. In other cases, device 115-d may, after being registered, access the wireless network without assistance from UE 115-c. In some examples, after registration, device 115-d may access the wireless network independently.

The registration process may be performed by a device subscription application the network operator provides with UE 115-c. A device subscription application may host functions for provisioning a list of devices with an existing subscription by providing a user interface to the subscriber. For example, choices for the user interface to the device subscription application may include a Hypertext Transfer Protocol (HTTP)-based interface. That is, the interface may be a device subscription menu tab included in a web page the subscriber may use to control other aspects of their account such as billing. In another example, the device subscription application may be a mobile application. For example, it may be an application on the UE 115-*c* used by the subscriber similar to a contact list or an address book. The device subscription application may update the device subscription list associated with a subscription stored in the network by the HSS 210 when a device is added or removed.

Figure 3:
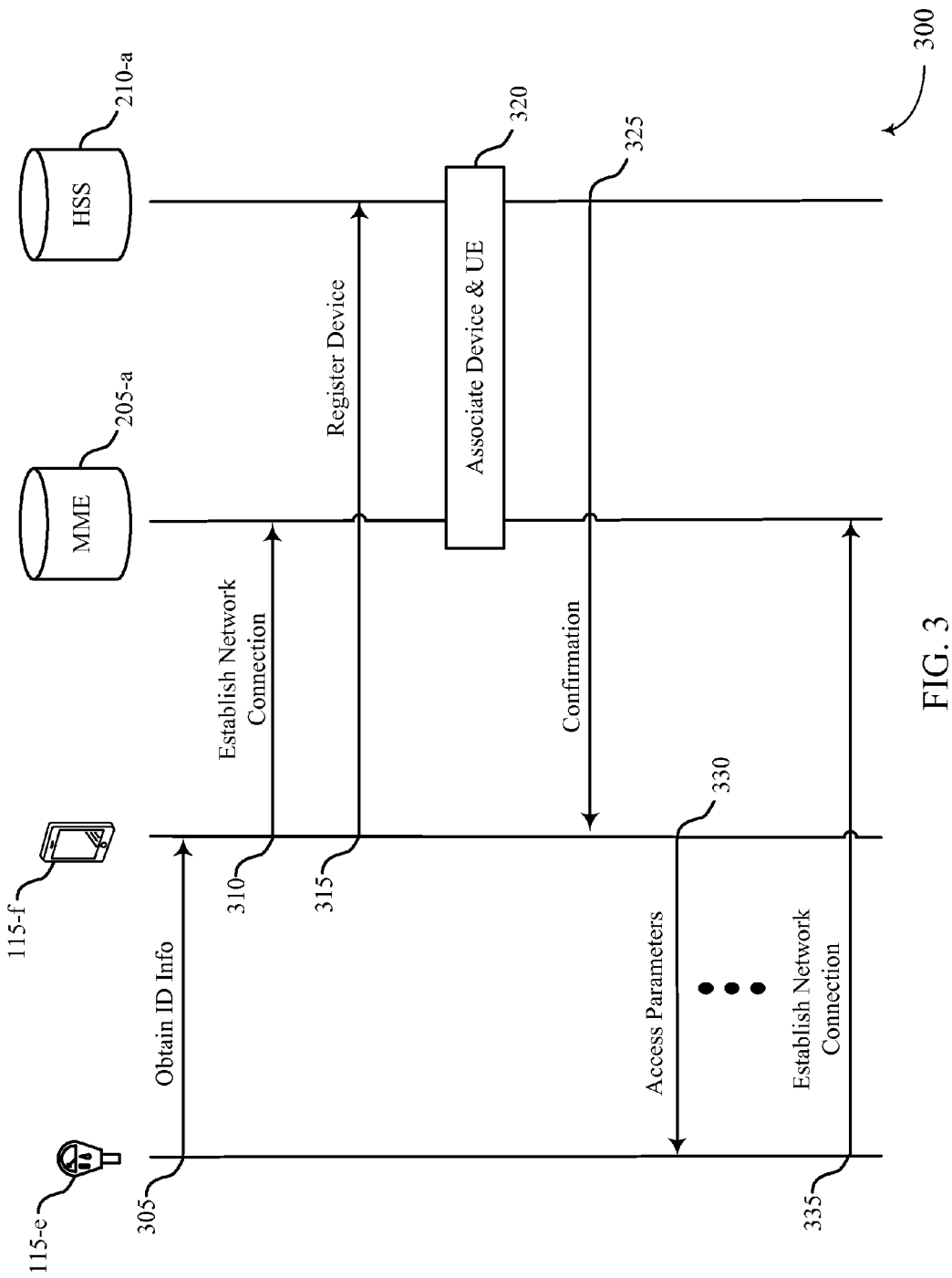
FIG. 3 illustrates an exemplary call flow in which a device is associated with another device's network subscription in accordance with the present disclosure.

FIG. 3 illustrates an example of a call flow 300 for associating a device 115-*e* with another device's subscription in accordance with various embodiments. Call flow 300 may include operations performed by a device 115-*e* that lacks credentials for network access, and UE 115-*f* that has access credentials. For example, UE 115-*f* may be associated with a subscription, while device 115-*e* may not; and device 115-*e* may be unable to access the network without participation by the UE 115-*f*. Device 115-*e* and UE 115-*f* may be examples of UEs and devices 115 described with reference to FIGS. 1-2. Call flow 300 may include operations performed by a MME 205-*a* and an HSS 210-*a*, which may be examples of the corresponding components of system 200 described with reference to FIG. 2.

In some cases, prior to initiating the operations depicted by call flow 300, UE 115-*f* may establish a local communication link with the device 115-*e* to obtain identification information for device 115-*e*. For example, UE 115-*f* may establish a connection with device 115-*e* utilizing a wireless personal area network (WPAN) connection, utilizing a universal serial bus (USB) link, utilizing a near field communication (NFC) link, a Bluetooth connection, or a Wireless Local Area Network (WLAN) link.

UE 115-*f* may then obtain identification information 305 for device 115-*e*. In some examples, obtaining the identification information for device 115-*e* is performed using a local communication link as described above, and in other cases the identification information may be obtained without a local communication link. For example, information may be obtained by scanning a Quick Response (QR) code, accessing a uniform resource locator (URL), or by entering information printed on device 115-*e* or the associated documentation. Identification information may include a serial number of the device 115-*e*, an international mobile station equipment identity (IMEI), a unique device identifier (UDID), information related to the capabilities of device 115-*e*, information related to the device manufacturer, or other identification information.

The UE 115-*f* may establish a connection 310 with a wireless network based on a network credential. For example, UE 115-*f* may send an attach request via a base station 105 to MME 205-*a*. In some cases, UE 115-*f* may send a temporary identity (e.g., a GUTI) with the attach request. If the GUTI was issued by MME 205-*a*, it may have information about UE 115-*f* stored in memory. In other cases, MME 205-*a* may communicate with another MME 205 identified by the GUTI to obtain identification and security information for UE 115-*f*. If MME 205-*a* does not have the information stored and is unable to retrieve it from another MME 205, the MME 205-*a* may request that UE 115-*f* provide the IMSI so that a new GUTI may be generated. UE 115-*f* may also exchange security keys and/or certificates with MME 205-*a* and/or HSS 210-*a* (via MME 205-*a*) to verify its identity. One or more security keys may be provided by the operator of the network to the UE 115-*f*, and may be stored in a SIM card, smart card, or UICC in the UE 115-*f*. MME 205-*a* may then proceed to create a network session for UE 115-*f* by communicating with a serving gateway (SGW) (not shown), which may facilitate exchange of user plane data for UE 115-*f*. In some cases, network connection 310 is established prior to UE 115-*f* obtaining identification information from device 115-*e*.

The UE 115-*f* may register the device 115-*e* to access the wireless network for service over the connection; the registration 315 may include associating the identification information for the device with the network credential of the UE 115-*f*. The registration may involve sending a request including the identification information of the device 115-*e* to HSS 210-*a* via MME 205-*a*. In some examples, the identification information for the device 115-*e* may be of a different kind than the network credential of the UE 115-*f*. For example, the network credential of the UE 115-*f* may be maintained in a UICC, whereas device 115-*e* may lack the UICC. In some examples, the network credential of the UE 115-*f* may be provisioned by an operator of the wireless network and the identification information may be established by a manufacturer of the device. In some cases, the network credential of the UE 115-*f* may represent a higher level of security or trust than the identification information for the device 115-*e*. For example, the identification information for the device 115-*e* may not include security keys provided by the network operator. In some examples, the identification information for the device includes a device identifier, device parameters, a URL, a shared key of the device, a public key of the device, or a public key certificate of the device.

In some examples, a device subscription application on UE 115-*f* may communicate with HSS 210-*a* to update the subscriber's device subscription list stored in the HSS 210-*a*. The device subscription application may access a specific HSS 210 associated with the subscriber in order to update the device subscription list. In some cases, if a public key of device 115-*e* is signed by the manufacturer, the device subscription application may also obtain the manufacture's public key through a secure channel. In another example, UE 115-*e* may use a manufacturer's certificate signed by a trusted third party such as Verisign. In this case, the manufacturer's public key may not be transferred through a secure channel. The device subscription application may then send a subscription update message that includes the identification information for device to HSS 210-*a* along with the subscriber's identity.

HSS 210-*a* and/or MME 205-*a* or other network entities may then update the subscription information of UE 115-*f* to include an association 320 between the user information for UE 115-*f* and device 115-*e*. For example, an association may be created between a UDID of device 115-*e* and an IMSI of UE 115-*f*. In some cases, association 320 may be created based on an authentication of the UE 115-*f*. For example, association 320 of UE 115-*f* and device 115-*e* may be permissible based on the registration request being performed by an authenticated UE 115-*f* communicating over a trusted connection. A registration request transmitted via an external network, e.g., via the internet, may be rejected. Adding or removing device 115-*e* may be subject to approval by the operator. For example, a network operator may determine whether to approve the device 115-*e* based on a subscription type, billing models, roaming agreements etc.

In some cases, e.g., if the device credential is a secret key, HSS 210-*a* may compute a device specific session key using a well-known key derivation function (e.g., a hash message authentication code (HMAC) or secure hash algorithm (SHA) 256) and include it in the updated device subscription list. Then, HSS 210-*a* may send the updated device subscription list, along with the device keys, session keys, and a nonce (arbitrary number) to MME 205-*a*. The nonce may be provided to the device during the serving network authentication of the device so that the device can derive the same device session keys. If the device credential is a public key, HSS 210-*a* may send the updated device subscription list and the public key to MME 205-*a*.

If the association 320 is successful, HSS 210-*a* (or, in some cases, MME 205-*a* or another network entity) may send a confirmation message 325 to UE 115-*f*. The confirmation message 325 may include credentials for device 115-*e* to use for accessing the wireless network. For example, the confirmation message 325 may include a network credential for device 115-*e* to use for access. This network credential may be different from the network credential of the UE. The network credential may include at least one of a shared key provisioned by a device manufacturer or a private-public key pair provisioned by a device manufacturer. That is, the UE may obtain credentials for the device to access the wireless network, and those credentials may be different from the network credential utilized by the UE 115-*f* to establish a network connection. The UE may therefore not share its own network credential with the device to be added to its subscription list stored in HSS. Allowing device 115-*e* to utilize a different network credential may provide for a measure of security that simply sharing the UE's 115-*f* network credential might not. For instance, if device 115-*e* accesses the network with its own network credential, and if the security of device 115-*e* is compromised after it has been associated with the UE's 115-*f* subscription, the privacy of UE's 115-*f*'s network credential may remain intact because device 115-*e* may not have access to the UE's 115-*f* credential. Further, the device 115-*e* can access, with its own credential, an out-of-band network (e.g., non-cellular network) that is different from a UE's serving network (e.g., cellular network) without relying on a UE's credential.

UE 115-*f* may then send credentials for accessing the wireless network 330 for the network to the device 115-*e* over the local communication link. The credentials for accessing the wireless network 330 may, as discussed, be different from the network credential of the UE. In some examples, the credentials for accessing the wireless network 330 may include the network credential, a network list, a subscription identity associated with the network credential of the UE or a network identifier. The network credential may include at least one of a shared key provisioned by a device manufacturer or a private-public key pair provisioned by a device manufacturer. In some examples, UE 115-*f* may establish access restrictions for device 115-*e* by communicating with one or more network entities (e.g., MME 205-*a* or HSS 210-*a*). For example, UE 115-*f* may restrict the frequency, duration, or location that device 115-*e* may be allowed to access the wireless network. In some examples, the access restrictions include access time duration limits, quality-of-service (QoS) parameters, traffic type restrictions, time of use specifications, an expiry time, maximum bandwidth limits, service parameters, uplink throughput limits, or downlink throughput limits. Thus, the credentials for accessing the wireless network 330 may include information to facilitate device 115-*e* connecting to the wireless network and may also indicate access restrictions.

In some cases, UE 115-*f* may authenticate the identification information for the device 115-*e*. This may enable UE 115-*f* to determine that device 115-*e* is allowed to be registered with the wireless network. For example, UE 115-*f* may send an authentication request to a device authentication server (e.g., a server operated by the device manufacturer). This authentication request may be transmitted over the network connection (or another communications link) and through the internet. UE 115-*f* may wait to receive an authentication response from the device authentication server prior to registering the device 115-*e*. If device 115-*e* cannot be authenticated, UE 115-*f* may abort the registration. In some cases, UE 115-*f* may include and run a device subscription application that UE 115-*f*, and a user of UE 115-*f*, may utilize for managing devices associated with UE's 115-*f* subscription. UE 115-*f* may authenticate device 115-*e* before allowing it to be added to the device subscription application.

When device 115-*e* has received the credentials for accessing the wireless network 330, it may then establish a network connection 335 based on the association 320 of the device identification information and the subscription identity of the UE 115-*f*. For example, device 115-*e* may send an attach request to MME 205-*a*. However, the attach procedure for device 115-*e* may differ from the attach procedure for UE 115-*f*. For example, the network may allow device 115-*e* to establish a connection without performing a security authentication procedure that requires keys stored on a UICC or with a SIM. Also, network connection 335 may be subject to access restrictions established by UE 115-*f*. In some cases, UE 115-*f* may alter the security restrictions. For example, the user may communicate with the network operator, e.g., by accessing an application on UE 115-*f* or by utilizing an web interface of the network operator.

In some cases, the network may implement security procedures based on a device credential other than a UICC, such as the public key or certificate of the device 115-*f*. In one example, if such a public key is available, a device ID may be defined as the hash of the device's public key. In some cases, a device public key may be signed by a trusted third party (e.g., Verisign or IRNA) and may be available in the form of a X.509 certificate.

The subscriber for UE 115-*f* may also remove device 115-*e* from the device subscription list by deselecting the associated device ID from the device subscription application. A deregistration request may be sent to HSS 210-*a* and optionally to MME 205-*a* utilizing the same call path as the registration. If the deregistration is successful, the device subscription application on UE 115-*f*, HSS 210-*a* and MME 205-*a* may remove device 115-*e* from the subscriber's device subscription list, and the MME 205-*a* deletes security and other contexts associated with device 115-*e*.

Figure 4:
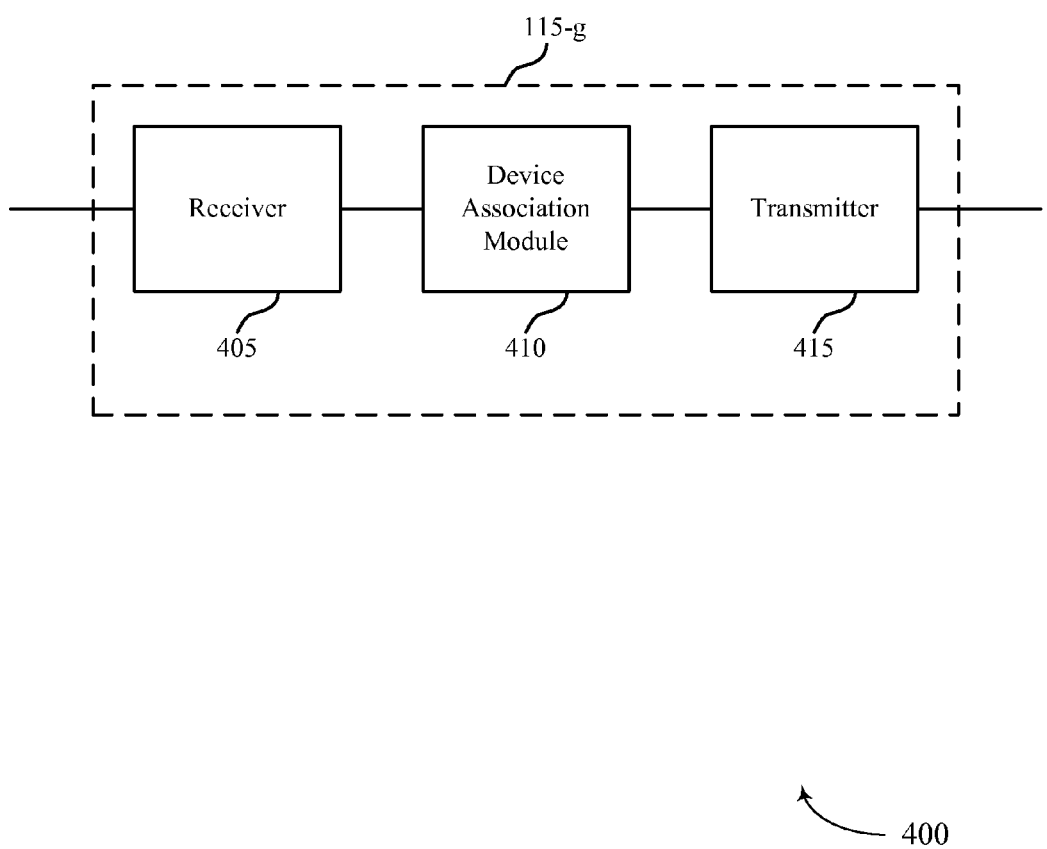
FIG. 4 shows a block diagram of an exemplary device configured according to the present disclosure.

FIG. 4 shows a block diagram 400 of a UE 115-*g* configured for associating a device with another device's network subscription. The UE 115-*g* may be an example of one or more aspects of a UE 115 described with reference to FIGS. 1-3. The UE 115-*g* may also be referred to as an apparatus or a device. The UE 115-*g* may include a receiver 405, a device association module 410, and/or a transmitter 415. The UE 115-*g* may also include a processor. Each of these components may be in communication with each other.

The components of the UE 115-*g* may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another Semi-Custom IC), which may be programmed in any manner known in the art. The functions of each unit may also be implemented, in whole or in part, with instructions embodied in a memory, formatted to be executed by one or more general or application-specific processors.

The receiver 405 may receive information such as packets, user data, and/or control information associated with various information channels (e.g., control channels, data channels, etc.). Information may be passed on to the device association module 410, and to other components of the UE 115-g. For example, receiver 405 may receive messages from a core network 130 via a base station 105 relevant to registering a device with the network.

The device association module 410 may be configured to obtain identification information for a device that lacks access credentials. The device association module 410 may also be configured to establish a connection with a wireless network based on a network credential of the UE 115-g. The device association module 410 may be configured to register the device for to access the wireless network over the connection, and the registration may include associating the identification information for the device with the network credential of the UE 115-g.

The transmitter 415 may transmit the one or more signals received from other components of the UE 115-g. For example, transmitter 415 may transmit messages to a core network 130 (FIGS. 1 and 2) via a base station 105 (FIGS. 1 and 2) relevant to registering a device with the wireless network. In some examples, the transmitter 415 may be collocated with the receiver 405 in a transceiver module. The transmitter 415 may include a single antenna, or it may include several antennas.

Figure 5:
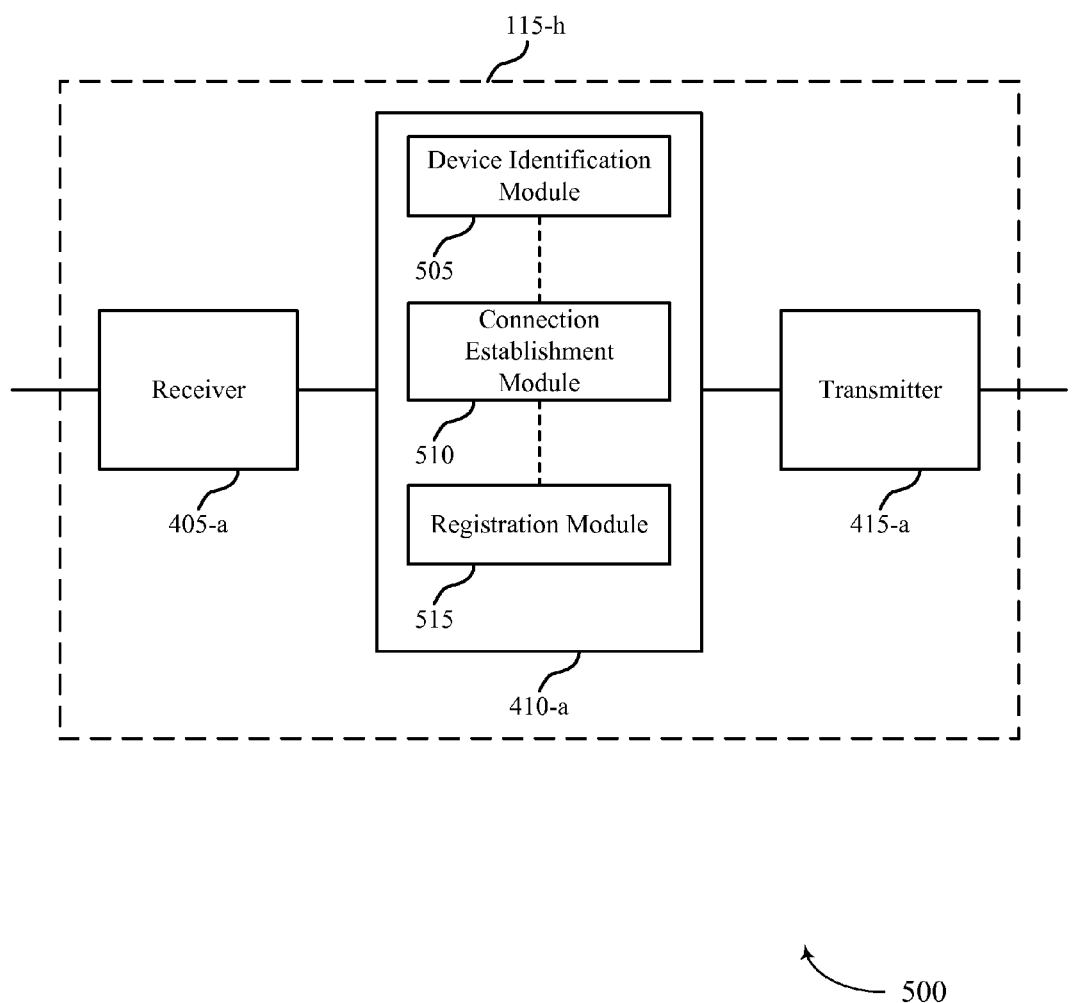
FIG. 5 shows a block diagram of an exemplary device configured according to the present disclosure.

FIG. 5 shows a block diagram 500 of a UE 115-h configured for associating a device with another device's network subscription. The UE 115-h may be an example of one or more aspects of a UE 115 described with reference to FIG. 1-4. The UE 115-g may also be referred to as an apparatus or a device. The UE 115-h may include a receiver 405-a, a device association module 410-a, and/or a transmitter 415-a. The UE 115-h may also include a processor and memory. Each of these components may be in communication with each other. The device association module 410-a may also include a device identification module 505, a connection establishment module 510, and a registration module 515.

The components of the UE 115-h may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The receiver 405-a may receive information which may be passed on to the device association module 410-a, and to other components of the UE 115-h. The device association module 410-a may be configured to perform the operations described above with reference to FIG. 4. The transmitter 415-a may transmit the one or more signals received from other components of the UE 115-h.

The device identification module 505 may be configured to obtain identification information for a device as described above with reference to FIG. 3. In some cases, the device lacks access credentials for a wireless network. In some examples, the identification information for the device may be of a different kind than the network credential of the UE 115-h. In some examples, obtaining the identification information for the device over the local communication link may include at least one of scanning a Quick Response (QR) code, utilizing a wireless personal area network (WPAN) connection, utilizing a universal serial bus (USB) link, utilizing a near field communication (NFC) link, utilizing a Wireless Local Area Network (WLAN) link, or accessing a uniform resource locator (URL). In some examples, the identification information for the device includes at least a device identifier, device parameters, a URL, a shared key of the device, a public key of the device, or a certificate of the device.

The connection establishment module 510 may be configured to establish a connection with the wireless network based on a network credential of the UE 115-h as described above with reference to FIG. 3. For example, connection establishment module 510 may be configured to perform an attach procedure. In some examples, connection establishment module 510 establishes a connection in coordination with a UICC (e.g., as described below).

The registration module 515 may be configured to register the device to access the wireless network over the connection as described above with reference to FIG. 3. In some cases, the registration includes associating the identification information for the device with the network credential of the UE 115-h. The registration module 515 may also be configured to send the identification information to a home subscriber server (HSS) of the UE 115-h via the connection. The registration module 515 may also be configured to provide the wireless network with access restrictions for the device. In some examples, the access restrictions include access time duration limits, time of use specifications, maximum bandwidth limits, service parameters, uplink throughput limits, and/or downlink throughput limits. In some examples, registering the device at the wireless network includes sending a registration request for the device to the network via the connection. The registration module 515 may also be configured to receive a registration acknowledgment for the device from the network via the connection.

Figure 6:
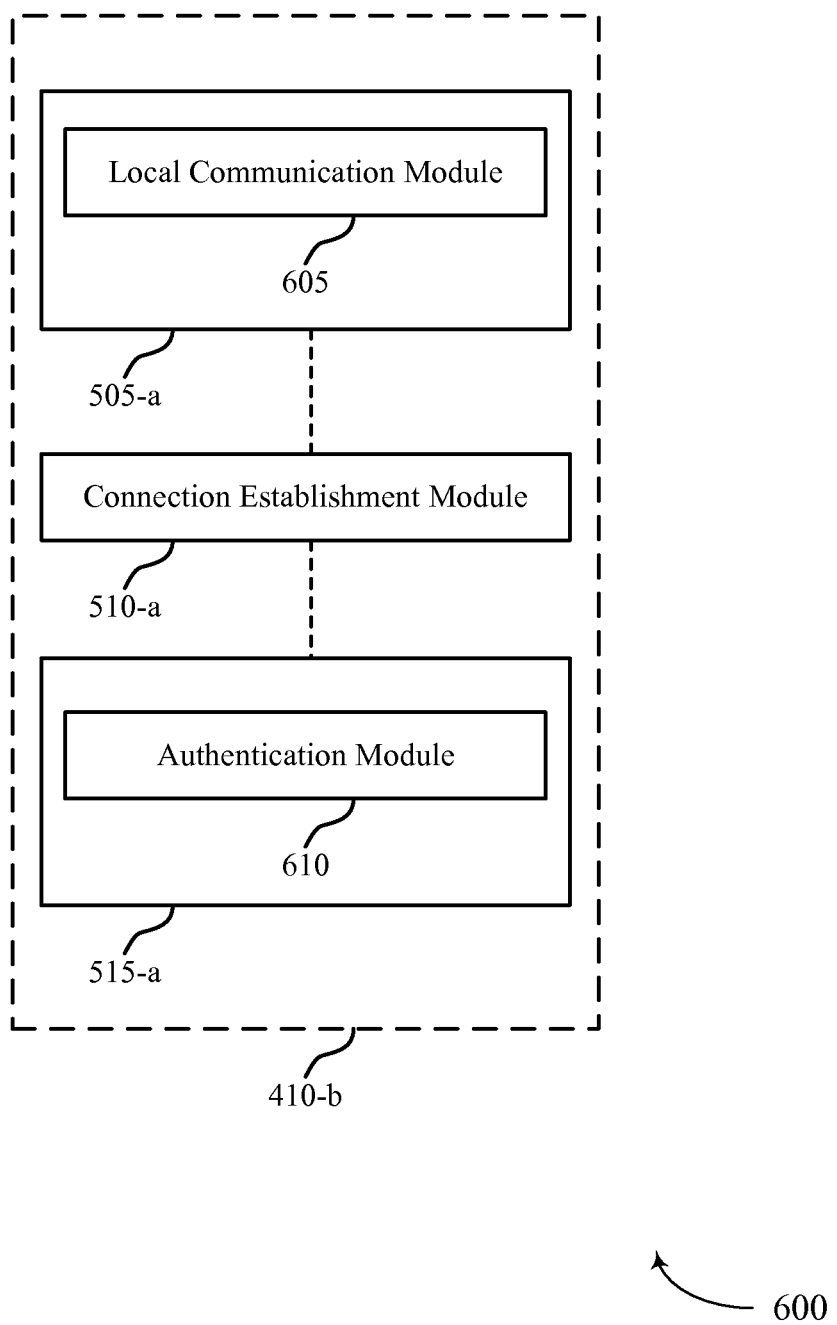
FIG. 6 shows a block diagram of an exemplary configured according to the present disclosure.

FIG. 6 shows a block diagram 600 of a device association module 410-b configured for associating a device with another device's network subscription. The device association module 410-b may be an example of one or more aspects of a device association module 410 described with reference to FIGS. 4 and 5. The device association module 410-b may include a device identification module 505-a, a connection establishment module 510-a, and a registration module 515-a. Each of these modules may perform the functions described above with reference to FIG. 5. The device identification module 505-a may further include a local communication module 605. The registration module 515-a may further include an authentication module 610.

The components of the device association module 410-b may, individually or collectively, be implemented with at least one ASIC adapted to perform some or all of the applicable functions in hardware. In some examples, the functions may be performed by one or more other processing units (or cores), on at least one IC. In other examples, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The local communication module 605 may be configured to establish a local communication link with the device as described with reference to FIG. 3. In some cases the identification information for the device is obtained over the local communication link. The local communication module 605 may also be configured to send credentials for accessing the wireless network to the device over the local communication link, and the credentials for accessing the wireless network may be different from the network credential of, e.g., the UE 115-h (FIG. 5); and the credentials for accessing the wireless network may facilitate access to the wireless network by the device. In some examples, the credentials for accessing the wireless network include a network credential, a network list, a subscription identity associated with the network credential of the UE and/or a network identifier. In some cases, the subscription identity include a globally unique temporary identity (GUTI) or an international mobile subscriber identity (IMSI) of the UE and the network identifier comprises a network certificate, a public key, or a public land mobile network (PLMN) identity. The network credential may include at least one of a shared key provisioned by a device manufacturer or a private-public key pair provisioned by a device manufacturer.

The authentication module 610 may be configured to authenticate the identification information for the device by the UE 115 as described with reference to FIG. 3. The authentication module 610 may also be configured to determine whether the device is allowed to be registered with the wireless network. Additionally or alternatively, the authentication module 610 may be configured to send an authentication request to a device authentication server. The authentication module 610 may also be configured to receive an authentication response from the device authentication server, and authenticating the identification information for the device may be based on the authentication response.

Figure 7A:
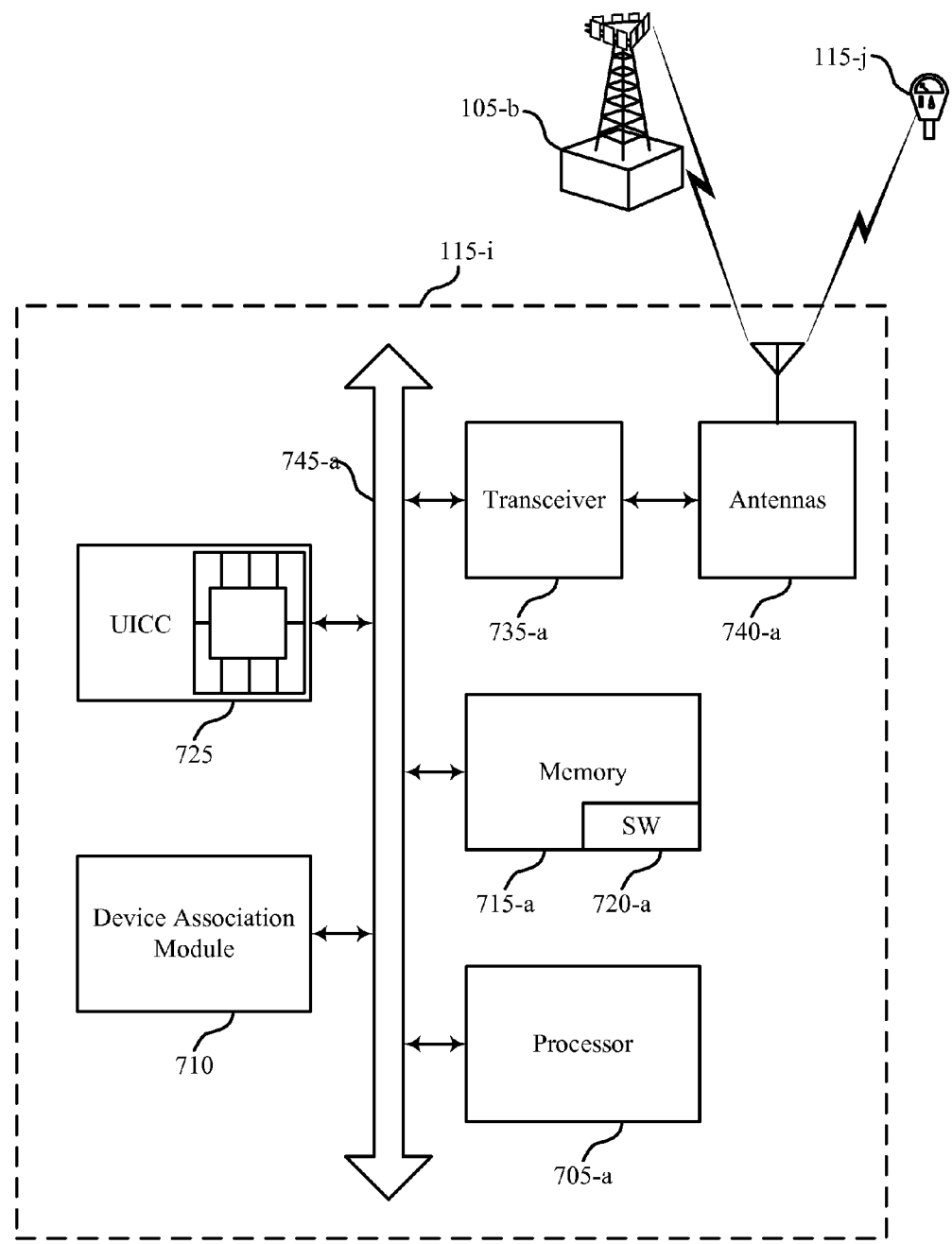
FIG. 7A illustrates a block diagram of an exemplary system that supports associating a device with another device's network subscription in accordance with the present disclosure n.

FIG. 7A shows a diagram of a system 701 for associating a device with another device's network subscription. System 701 may include a UE 115-i, which may be an example of a UE 115 with a network credential described with reference to FIGS. 1-6. The UE 115-i may include a device association module 710, which may be an example of a device association module described with reference to FIGS. 4-6. The UE 115-i may also include a UICC 725. The UE 115-i may include components for bi-directional voice and data communications, including components for transmitting communications and components for receiving communications. For example, UE 115-i may communicate with a base station 105-b and/or a device 115-j (e.g., over a local communications link, which may or may not be a wireless link). The device 115-j may be an MTC device, as described above. In some examples, the device 115-j is a device as described with reference to FIG. 7B.

The UICC 725 may be an integrated circuit that securely stores subscriber information, including the international mobile subscriber identity (IMSI) and the related keys used to identify and authenticate UE 115-i. UICC 725 may also contain a unique serial number, e.g., an integrated circuit card ID (ICCID), security authentication and ciphering information, temporary information related to the local network, a list of the services, a personal identification number (PIN), and a personal unblocking code (PUK) for PIN unlocking. In some cases, UICC 725 may be a circuit embedded in a removable plastic card.

The UE 115-i may also include a processor module 705-a, and memory 715 (including software (SW)) 720-a, a transceiver module 735-a, and one or more antenna(s) 740-a, which each may communicate, directly or indirectly, with each other (e.g., via one or more buses 745-a). The transceiver module 735-a may be configured to communicate bi-directionally, via the antenna(s) 740-a and/or one or more wired or wireless links, with one or more networks, as described above. For example, the transceiver module 735-a may be configured to communicate bi-directionally with a base station 105-b. The transceiver module 735-a may include a modem configured to modulate packets and provide the modulated packets to the antenna(s) 740-a for transmission, and to demodulate packets received from the antenna(s) 740-a. While the UE 115-i may include a single antenna 740-a, the UE 115-i may also have multiple antennas 740-a capable of concurrently transmitting and/or receiving multiple wireless transmissions. The transceiver module 735-a may also be capable of concurrently communicating with one or more base stations 105.

The memory 715-a may include random access memory (RAM) and read only memory (ROM). The memory 715-a may store computer-readable, computer-executable software/firmware code 720-a containing instructions that are configured to, when executed, cause the processor module 705-a to perform various functions described herein (e.g., obtaining identification information, establishing a connection with the wireless network, registering the device, etc.). Alternatively, the software/firmware code 720-a may not be directly executable by the processor module 705-a but may be configured to cause a computer (e.g., when compiled and executed) to perform functions described herein. The processor module 705-a may include an intelligent hardware device, e.g., a CPU, a microcontroller, an ASIC, etc.

Figure 7B:
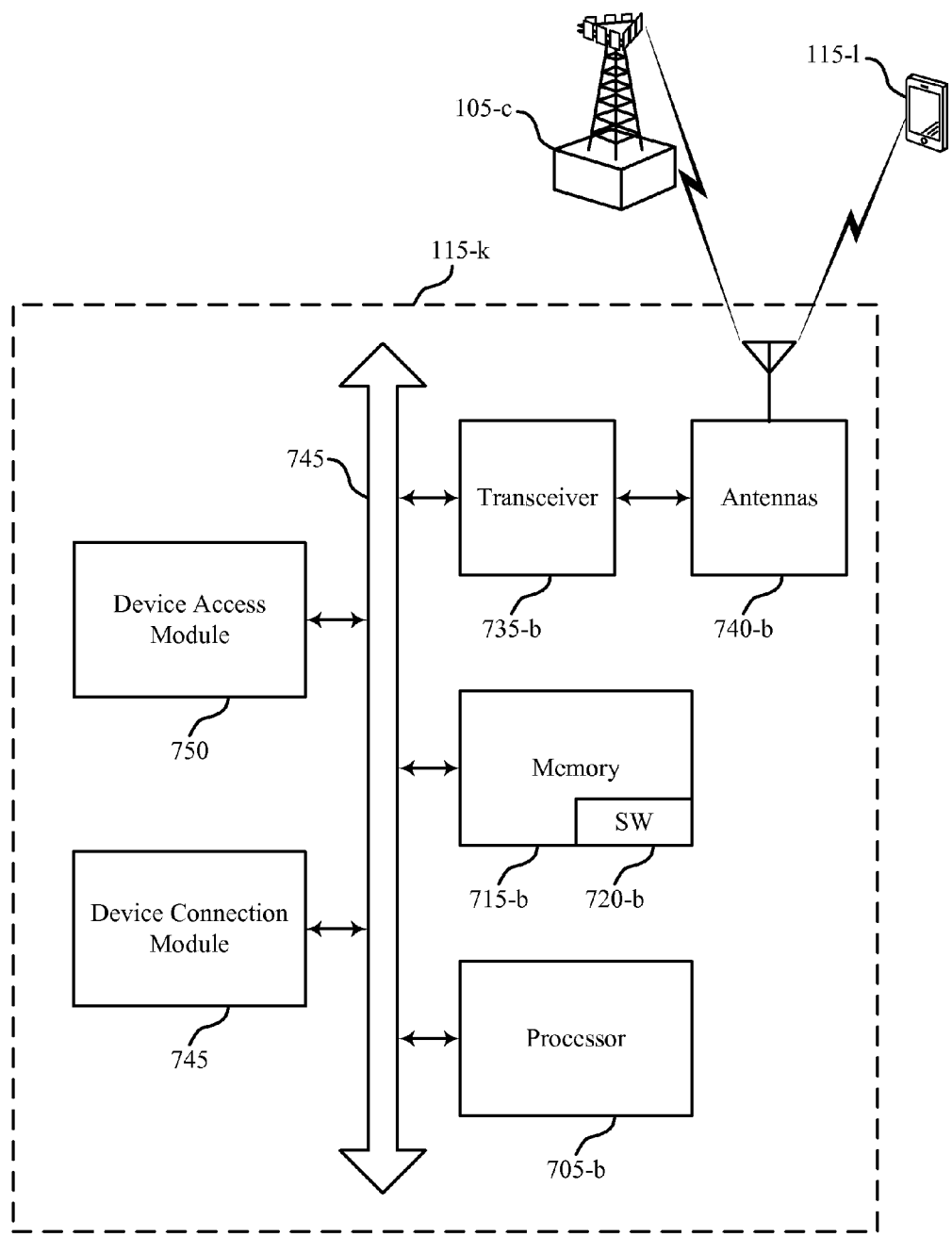
FIG. 7B illustrates a block diagram of an exemplary system that supports associating a device with another device's network subscription in accordance with the present disclosure.

FIG. 7B shows a diagram of a system 702 which supports associating a device with an existing UE subscription. System 702 may include a device 115-k, which may be an example of a device 115 that lacks a network credential as described with reference to FIGS. 1-6. In some examples, the device 115-k is an MTC device, which may be a low-cost or limited complexity MTC device described above. For example, device 115-k may lack a UICC or support for over-the-air provisioning or other SIM-based procedures. Device 115-k may include a device connection module 745 and a device access module 750. Device 115-k may also include components for bi-directional data communications including components for transmitting communications and components for receiving communications. For example, device 115-k may communicate with a base station 105-c using credentials for accessing the wireless network provided by UE 115-l, which may be an example or a UE 115 with a network credential as described above with reference to FIGS. 1-6.

The device connection module 745 may be configured to establish a connection with a UE 115-l over a local communication link as described above with reference to FIG. 3. The device access module 750 may be configured to receive credentials for accessing the wireless network from the UE 115-l over the local communication link as described above with reference to FIG. 3. In some cases, the credentials for accessing the wireless network are different from the network credential of the UE 115-l, and the credentials for accessing the wireless network may facilitate network access by the device 115-k according to its capabilities, etc. The device access module 750 may also be configured to access the wireless network utilizing the received credentials. For example, device 115-*k* may access the wireless network via a connection with base station 105-*c*.

The device 115-*k* may also include a processor module 705-*b*, and memory 715-*b* (including software (SW)) 720-*b*, a transceiver module 735-*b*, and one or more antenna(s) 740-*b*, which may perform the functions of the corresponding components described above with reference to FIG. 7A. The memory 715-*b* may store computer-readable, computer-executable software/firmware code 720-*b* containing instructions that are configured to, when executed, cause the processor module 705-*b* to perform various functions described herein (e.g., communicate with a UE 115, access a network utilizing parameters received from a UE 115, etc.). Alternatively, the software/firmware code 720-*b* may not be directly executable by the processor module 705-*b* but be configured to cause a computer (e.g., when compiled and executed) to perform functions described herein. The processor module 705-*b* may include an intelligent hardware device, e.g., a CPU, a microcontroller, an ASIC, etc.

Figure 8:
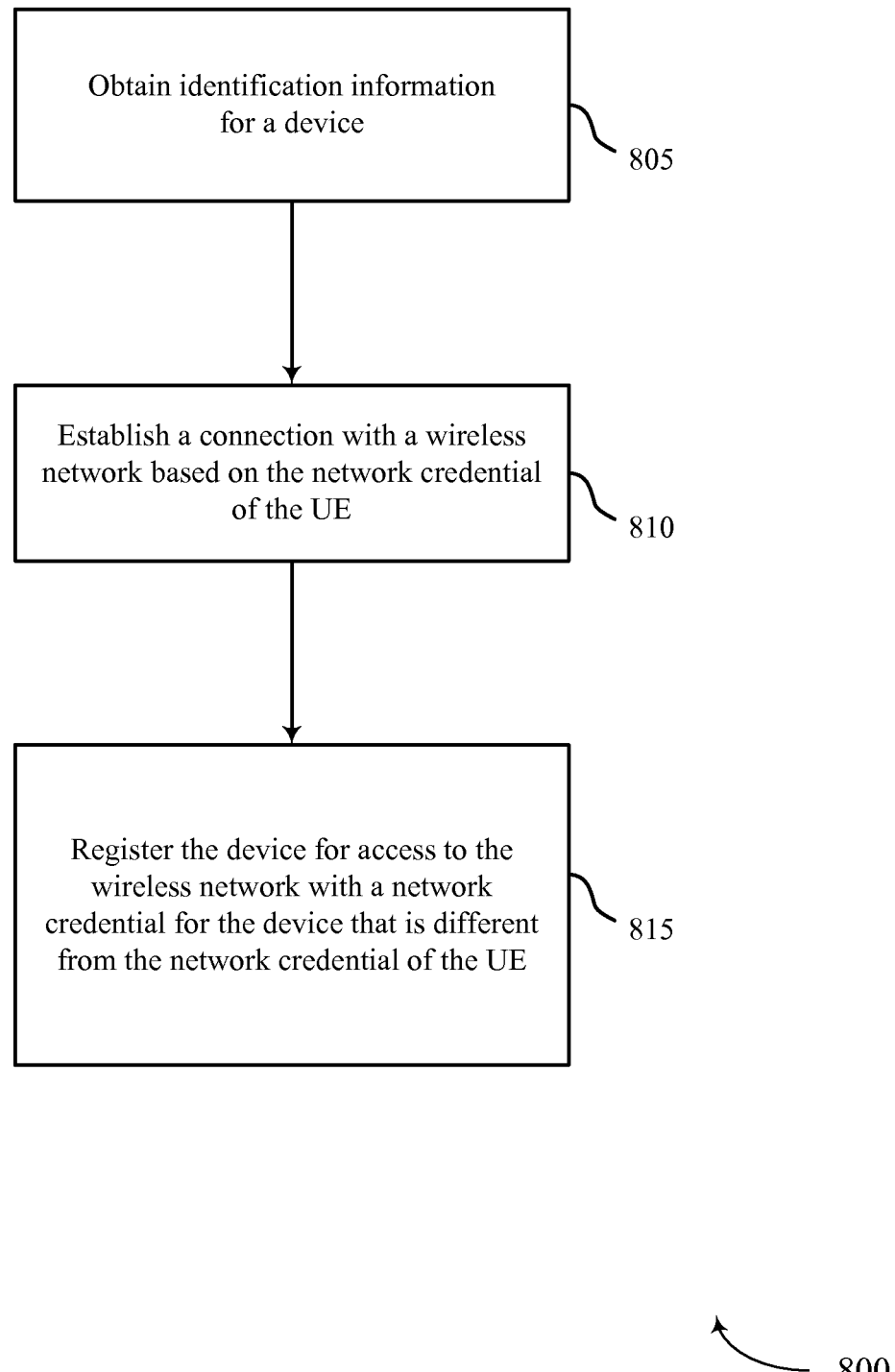
FIG. 8 illustrates a method for associating a device with another device's network subscription.

FIG. 8 shows a flowchart 800 illustrating a method for associating a device with another device's network subscription. The functions of flowchart 800 may be implemented by a UE 115 or its components as described with reference to FIGS. 1-7A. In certain examples, the blocks of the flowchart 800 may be performed by a device association module as described with reference to FIGS. 4-7A.

At block 805, the UE 115 may obtain identification information for a device as described above with reference to FIG. 3. The device may lack access credentials for the wireless network. In certain examples, the functions of block 805 may be performed by the device identification module 505 as described above with reference to FIG. 5.

At block 810, the UE 115 may establish a connection with a wireless network based on a network credential of the UE 115 as described above with reference to FIG. 3. In certain examples, the functions of block 810 may be performed by the connection establishment module 510 as described above with reference to FIG. 5.

At block 815, the UE 115 may register the device for access to the wireless network with a network credential for the device that is different from the network credential of the UE as described above with reference to FIG. 3, The registration may include associating the identification information for the device with the network credential of the UE. In certain examples, the functions of block 815 may be performed by the registration module 515 as described above with reference to FIG. 5.

Figure 9:
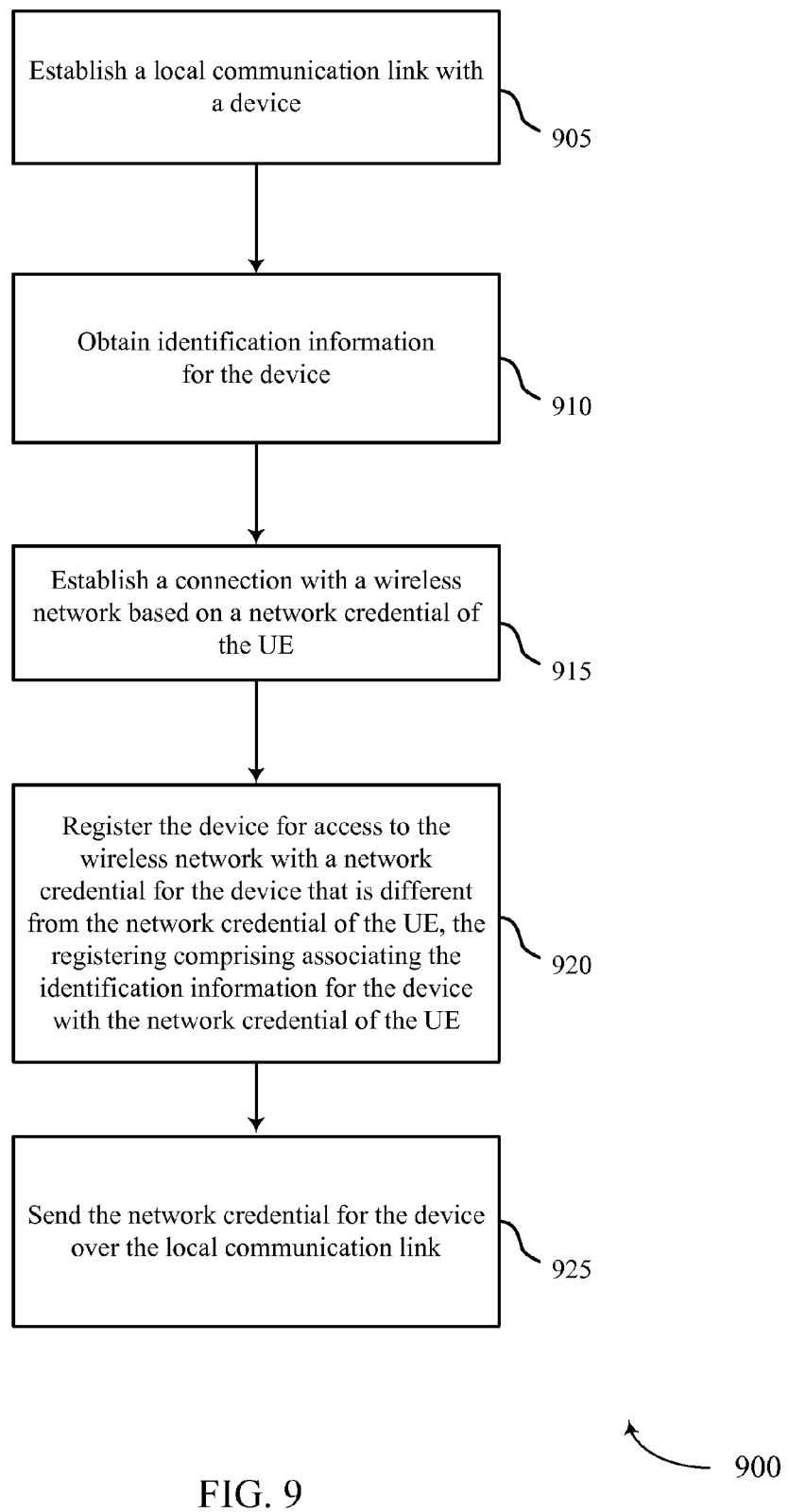
FIG. 9 illustrates a method for associating a device with another device's network subscription.

FIG. 9 shows a flowchart 900 illustrating a method for associating a device with another device's network subscription. The functions of flowchart 900 may be implemented by a UE 115 or its components as described with reference to FIGS. 1-7A. In certain examples, the blocks of the flowchart 900 may be performed by the device association module as described with reference to FIGS. 4-7A. The method described in flowchart 900 may also incorporate aspects of flowchart 800 of FIG. 8.

At block 905, the UE 115 may establish a local communication link with a device as described above with reference to FIG. 3. In certain examples, the functions of block 905 may be performed by the local communication module 605 as described above with reference to FIG. 6.

At block 910, the UE 115 may obtain identification information for the device to establish credentials as described above with reference to FIG. 3. In certain examples, the functions of block 910 may be performed by the device identification module 505 as described above with reference to FIG. 5.

At block 915, the UE 115 may establish a connection with a wireless network based on a network credential of the UE as described above with reference to FIG. 3. In certain examples, the functions of block 915 may be performed by the connection establishment module 510 as described above with reference to FIG. 5.

At block 920, the UE 115 may register the device for access to the wireless network with a network credential for the device that is different from the network credential of the UE as described above with reference to FIG. 3, and the registration may include associating the identification information for the device with the network credential of the UE. The network credential for the device may include at least one of a shared key provisioned by a device manufacturer or a private-public key pair provisioned by a device manufacturer, or a combination thereof. In certain examples, the functions of block 920 may be performed by the registration module 515 as described above with reference to FIG. 5.

At block 925, the UE 115 may send the network credential for the device for over the local communication link as described above with reference to FIG. 3. In certain examples, the functions of block 925 may be performed by the local communication module 605 as described above with reference to FIG. 6.

Figure 10:
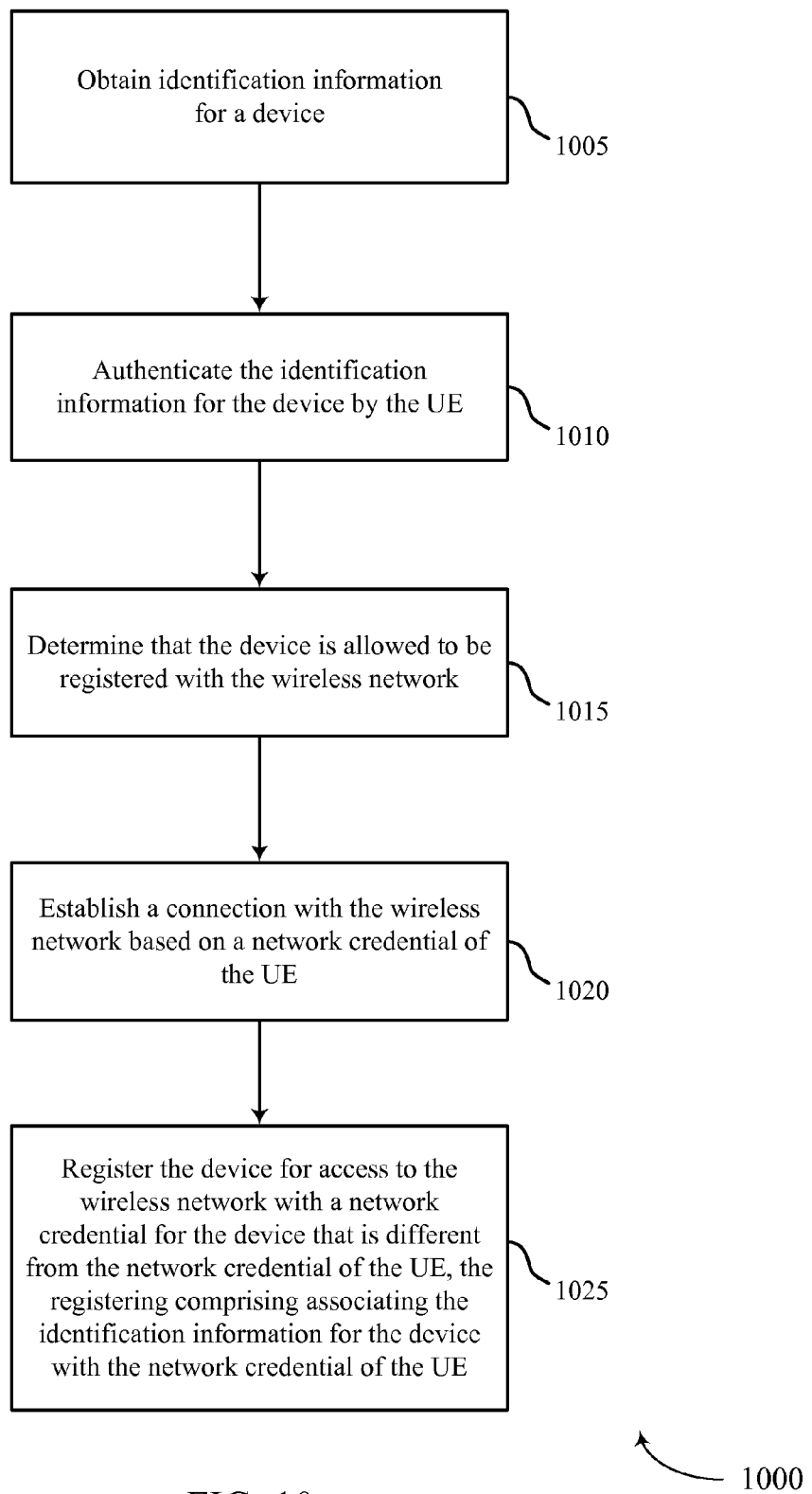
FIG. 10 illustrates a method for associating a device with another device's network subscription.

FIG. 10 shows a flowchart 1000 illustrating a method for associating a device with an existing UE subscription in accordance with various embodiments. The functions of flowchart 1000 may be implemented by a UE 115 or its components as described with reference to FIGS. 1-7. In certain examples, the blocks of the flowchart 1000 may be performed by the device association module as described with reference to FIGS. 4-7A. The method described in flowchart 1000 may also incorporate aspects of flowcharts 800 to 900 of FIGS. 8-9.

At block 1005, the UE 115 may obtain identification information for a as described above with reference to FIG. 3. In certain examples, the functions of block 1005 may be performed by the device identification module 505 as described above with reference to FIG. 5.

At block 1010, the UE 115 may authenticate the identification information for the device by the UE as described above with reference to FIG. 3. In certain examples, the functions of block 1010 may be performed by the authentication module 610 as described above with reference to FIG. 6.

At block 1015, the UE 115 may determine that the device is allowed to be registered with the wireless network as described above with reference to FIG. 3. In certain examples, the functions of block 1015 may be performed by the authentication module 610 as described above with reference to FIG. 6.

At block 1020, the UE 115 may establish a connection with the wireless network based on a network credential of the UE as described above with reference to FIG. 3. In certain examples, the functions of block 1020 may be performed by the connection establishment module 510 as described above with reference to FIG. 5.

At block 1025, the UE 115 may register the device for access to the wireless network with a network credential for the device that is different from the network credential of the UE as described above with reference to FIG. 3, and the registration may include associating the identification information for the device with the network credential of the UE. The network credential for the device may include at least one of a shared key provisioned by a device manufacturer or a private-public key pair provisioned by a device manufacturer, or a combination thereof. In certain examples, the functions of block 1025 may be performed by the registration module 515 as described above with reference to FIG. 5.

Figure 11:
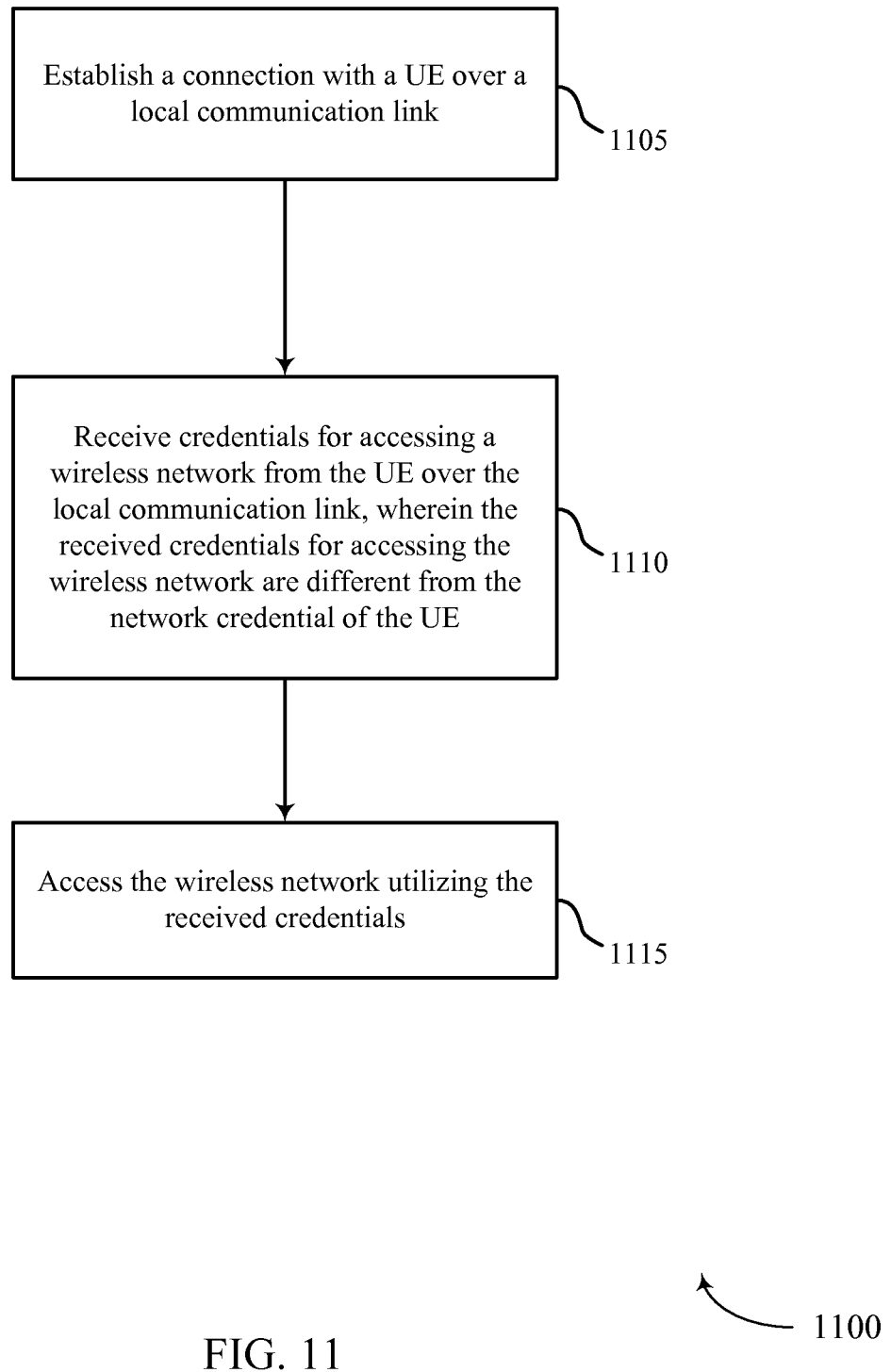
FIG. 11 illustrates a method for associating a device with another device's network subscription.

FIG. 11 shows a flowchart 1100 illustrating a method for associating a device with an existing UE subscription in accordance with various embodiments. The functions of flowchart 1100 may be implemented by a device 115 that lacks a network credential, or its components, as described with reference to FIGS. 1-3, and 7B. The method described in flowchart 1100 may also incorporate aspects of flowcharts 800 to 1000 of FIGS. 8-10.

At block 1105, the device 115 may establish a connection with a UE over a local communication link as described above with reference to FIG. 3. In certain examples, the functions of block 1105 may be performed by the device connection module 745 as described above with reference to FIG. 7B.

At block 1110, the device 115 may receive credentials for accessing the wireless network from the UE over the local communication link as described above with reference to FIG. 3. The credentials for accessing the wireless network may be different from the network credential of the UE. In certain examples, the functions of block 1110 may be performed by the device access module 750 as described above with reference to FIG. 7B.

At block 1115, the device 115 may access the wireless network utilizing the received credentials as described above with reference to FIG. 3. In certain examples, the functions of block 1115 may be performed by the device access module 750 as described above with reference to FIG. 7B.

It should be noted that the methods illustrated by flowcharts 800, 900, 1000 and 1100 are example implementations, and that the operations of the method, and the steps may be rearranged or otherwise modified such that other implementations are possible.

The detailed description set forth above in connection with the appended drawings describes example embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C, or any combination thereof" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication performed by a user equipment (UE), comprising:
   obtaining identification information for a device;
   establishing a connection with a wireless network based on a network credential of the UE;
   transmitting to the wireless network the identification information for the device; and
   registering the device for access to the wireless network under a subscription associated with the UE with a network credential for the device that is different from the network credential of the UE, the registering comprising associating the identification information for the device with the network credential of the UE.

2. The method of claim 1, further comprising:
   establishing a local communication link with the device, wherein the identification information for the device is obtained over the local communication link.

3. The method of claim 2, further comprising:
   sending the network credential for the device over the local communication link.

4. The method of claim 3, wherein the network credential for the device comprises at least one of:
   a subscription identity associated with the network credential of the UE or a network identifier, or any combination thereof.

5. The method of claim 4, wherein the subscription identity comprises at least one of:
   a globally unique temporary identity (GUTI) or an international mobile subscriber identity (IMSI) of the UE, or any combination thereof, and
   wherein the network identifier comprises at least one of:
   a public key certificate of the wireless network, a public key of the wireless network, or a public land mobile network (PLMN) identity, or any combination thereof.

6. The method of claim 1, wherein the network credential for the device comprises at least one of:
   a shared key provisioned by a device manufacturer or a private-public key pair provisioned by a device manufacturer, or any combination thereof.

7. The method of claim 1, further comprising:
   authenticating the identification information for the device by the UE; and
   determining whether the device is allowed to be registered with the wireless network.

8. The method of claim 7, further comprising:
   sending an authentication request to a device authentication server.

9. The method of claim 8, further comprising:
   receiving an authentication response from the device authentication server, wherein authenticating the identification information for the device is based on the authentication response.

10. The method of claim 1, further comprising:
    sending the identification information to a home subscriber server (HSS) of the UE via the connection with the wireless network.

11. The method of claim 1, wherein the obtaining the identification information for the device comprises at least one of:
    scanning a Quick Response (QR) code, utilizing a wireless personal area network (WPAN) connection, utilizing a universal serial bus (USB) link, utilizing a near field communication (NFC) link, utilizing a Wireless Local Area Network (WLAN) link, or accessing a uniform resource locator (URL), or any combination thereof.

12. The method of claim 1, wherein the identification information for the device comprises at least one of:
    a device identifier, device parameters, a URL, a shared key of the device, a public key of the device, or a public key certificate of the device, or any combination thereof.

13. The method of claim 1, further comprising:
    providing the wireless network with access restrictions for the device.

14. The method of claim 13, wherein the access restrictions comprise at least one of:
    access time duration limits, time of use specifications, maximum bandwidth limits, service parameters, uplink throughput limits, or downlink throughput limits, or any combination thereof.

15. The method of claim 1, wherein registering the device comprises:
    sending a registration request for the device to the wireless network via the connection.

16. The method of claim 15, further comprising:
    receiving a registration acknowledgment responsive to the registration request from the wireless network via the connection.

17. The method of claim 1, wherein the identification information for the device is of a different kind than the network credential of the UE.

18. The method of claim 1, wherein the network credential of the UE is maintained in a universal integrated circuit card (UICC) of the UE or based on information obtained from a subscriber identity module (SIM) of the UE.

19. The method of claim 1, wherein the network credential of the UE is provisioned by an operator of the wireless network and the identification information for the device is established by a manufacturer of the device.

20. A method of wireless communication performed by a device, comprising:
    establishing a connection with a user equipment (UE) over a local communication link;
    receiving credentials for accessing a wireless network from the UE over the local communication link, wherein the received credentials for accessing the wireless network are associated with a subscription of the UE, wherein the association with the subscription is based at least in part on an association between identification information of the device transmitted to the wireless network by the UE and a network credential of the UE, and wherein the received credentials are different from the network credential of the UE; and
    accessing the wireless network utilizing the received credentials.

21. An apparatus for wireless communication, comprising:
    means for obtaining identification information for a device;
    means for establishing a connection with a wireless network based on a network credential of the apparatus;
    means for transmitting to the wireless network the identification information for the device; and
    means for registering the device for access to the wireless network under a subscription associated with the apparatus with a network credential for the device that is different from the network credential of the apparatus, the registering comprising associating the identification information for the device with the network credential of the apparatus.

22. The apparatus of claim 21, further comprising:
    means for establishing a local communication link with the device, wherein the means for obtaining are operative to obtain the identification information over the local communication link.

23. The apparatus of claim 22, further comprising:
    means for sending credentials for accessing the wireless network to the device over the local communication link.

24. The apparatus of claim 23, wherein the credentials for accessing the wireless network comprise at least one of:
    a subscription identity associated with the network credential of the apparatus or a network identifier, or any combination thereof.

25. The apparatus of claim 24, wherein the subscription identity comprises at least one of:
    a globally unique temporary identity (GUTI) or an international mobile subscriber identity (IMSI) of the apparatus, or any combination thereof, and
    wherein the network identifier comprises at least one of:
    a public key certificate of the wireless network, a public key of the wireless network, or a public land mobile network (PLMN) identity, or any combination thereof.

26. The apparatus of claim 21, wherein the network credential for the device comprises at least one of:
    a shared key provisioned by a device manufacturer or a private-public key pair provisioned by a device manufacturer, or any combination thereof.

27. The apparatus of claim 21, further comprising:
    means for authenticating the identification information for the device; and
    means for determining whether the device is allowed to be registered with the wireless network.

28. The apparatus of claim 27, further comprising:
    means for sending an authentication request to a device authentication server.

29. The apparatus of claim 28, further comprising:
    means for receiving an authentication response from the device authentication server, wherein the means for authenticating are operative to authenticate based on the authentication response.

30. The apparatus of claim 21, further comprising:
    means for sending the identification information to a home subscriber server (HSS) of the apparatus via the connection with the wireless network.

31. The apparatus of claim 21, wherein the means for obtaining the identification information comprise at least one of:
    means for scanning a Quick Response (QR) code, means for utilizing a wireless personal area network (WPAN) connection, means for utilizing a universal serial bus (USB) link, means for utilizing a near field communication (NFC) link, means for utilizing a Wireless Local Area Network (WLAN) link, or means for accessing a uniform resource locator (URL), or any combination thereof.

32. The apparatus of claim 21, wherein the identification information for the device comprises at least one of:
    a device identifier, device parameters, a URL, a shared key of the device, a public key of the device, or a public key certificate of the device, or any combination thereof.

33. The apparatus of claim 21, further comprising:
    means for providing the wireless network with access restrictions for the device.

34. The apparatus of claim 33, wherein the access restrictions comprise at least one of:
    access time duration limits, time of use specifications, maximum bandwidth limits, service parameters, uplink throughput limits, or downlink throughput limits, or any combination thereof.

35. The apparatus of claim 21, wherein the means for registering the device comprise:
    means for sending a registration request for the device to the wireless network via the connection.

36. The apparatus of claim 35, further comprising:
    means for receiving a registration acknowledgment responsive to the registration request from the wireless network via the connection.

37. The apparatus of claim 21, wherein the identification information for the device is of a different kind than the network credential of the apparatus.

38. The apparatus of claim 21, wherein the network credential of the apparatus is maintained in a universal integrated circuit card (UICC) or based on information obtained from a subscriber identity module (SIM).

39. The apparatus of claim 21, wherein the network credential of the apparatus is provisioned by an operator of the wireless network and the identification information for the device is established by a manufacturer of the device.

40. An apparatus for wireless communication, comprising:
    means for establishing a connection with a user equipment (UE) over a local communication link;
    means for receiving credentials for accessing a wireless network from the UE over the local communication link, wherein the received credentials for accessing the wireless network are associated with a subscription of the UE, wherein the association with the subscription is based at least in part on an association between identification information of the apparatus transmitted to the wireless network by the UE and a network credential of the UE, and wherein the received credentials are different from the network credential of the UE; and means for accessing the wireless network utilizing the received credentials.

41. An apparatus for wireless communication, comprising:
at least one processor;
memory in electronic communication with the at least one processor; and
instructions stored in the memory and operable, when executed by the at least one processor, to cause the apparatus to:
obtain identification information for a device;
establish a connection with a wireless network based on a network credential of the apparatus;
transmit to the wireless network the identification information for the device; and
register the device for access to the wireless network under a subscription associated with the apparatus with a network credential for the device that is different from the network credential of the apparatus by associating the identification information for the device with the network credential of the apparatus.

42. The apparatus of claim 41, the instructions being operable to cause the apparatus to:
establish a local communication link with the device; and
obtain the identification information for the device over the local communication link.

43. The apparatus of claim 42, the instructions being operable to cause the apparatus to:
send the network credential for the device over the local communication link.

44. The apparatus of claim 43, wherein the network credential for the device comprises at least one of:
a subscription identity associated with the network credential of the apparatus or a network identifier, or any combination thereof.

45. The apparatus of claim 44, wherein the subscription identity comprises at least one of:
a globally unique temporary identity (GUTI) or an international mobile subscriber identity (IMSI) of the apparatus, or any combination thereof, and
wherein the network identifier comprises at least one of:
a public key certificate of the wireless network, a public key of the wireless network, or a public land mobile network (PLMN) identity, or any combination thereof.

46. The apparatus of claim 41, wherein the network credential for the device comprises at least one of:
a shared key provisioned by a device manufacturer or a private-public key pair provisioned by a device manufacturer, or any combination thereof.

47. The apparatus of claim 41, the instructions being operable to cause the apparatus to:
authenticate the identification information for the device by the apparatus; and
determine whether the device is allowed to be registered with the wireless network.

48. The apparatus of claim 47, the instructions being operable to cause the apparatus to:
send an authentication request to a device authentication server.

49. The apparatus of claim 48, the instructions being operable to cause the apparatus to:
receive an authentication response from the device authentication server; and authenticate the identification information for the device based on the authentication response.

50. The apparatus of claim 41, the instructions being operable to cause the apparatus to:
send the identification information to a home subscriber server (HSS) of the apparatus via the connection with the wireless network.

51. The apparatus of claim 41, wherein the instructions to obtain the identification information comprise instructions operable to cause the apparatus to:
scan a Quick Response (QR) code, utilize a wireless personal area network (WPAN) connection, utilize a universal serial bus (USB) link, utilize a near field communication (NFC) link, utilize a Wireless Local Area Network (WLAN) link, or access a uniform resource locator (URL), or any combination thereof.

52. The apparatus of claim 41, wherein the identification information for the device comprises at least one of:
a device identifier, device parameters, a URL, a shared key of the device, a public key of the device, or a public key certificate of the device, or any combination thereof.

53. The apparatus of claim 41, the instructions being operable to cause the apparatus to:
provide the wireless network with access restrictions for the device.

54. The apparatus of claim 53, wherein the access restrictions comprise at least one of:
access time duration limits, time of use specifications, maximum bandwidth limits, service parameters, uplink throughput limits, or downlink throughput limits, or any combination thereof.

55. The apparatus of claim 41, the instructions being operable to cause the apparatus to:
send a registration request for the device to the wireless network via the connection.

56. The apparatus of claim 55, the instructions being operable to cause the apparatus to:
receive a registration acknowledgment responsive to the registration request from the wireless network via the connection.

57. The apparatus of claim 41, wherein the identification information for the device is of a different kind than the network credential of the apparatus.

58. The apparatus of claim 41, wherein the network credential of the apparatus is maintained in a universal integrated circuit card (UICC) of the apparatus or based on information obtained from a subscriber identity module (SIM) of the apparatus.

59. The apparatus of claim 41, wherein the network credential of the apparatus is provisioned by an operator of the wireless network and the identification information for the device is established by a manufacturer of the device.

60. An apparatus for wireless communication, comprising:
at least one processor;
memory in electronic communication with the at least one processor; and
instructions stored in the memory and operable, when executed by the at least one processor, to cause the apparatus to:
establish a connection with a user equipment (UE) over a local communication link;
receive credentials for accessing a wireless network from the UE over the local communication link, wherein the received credentials for accessing the wireless network are associated with a subscription of the UE, wherein the association with the subscription is based at least in part on an association between identification information of the apparatus transmitted to the wireless network by the UE and a network credential of the UE, and wherein the received credentials are different from the network credential of the UE; and access the wireless network utilizing the received credentials.

61. A non-transitory computer-readable medium storing code for wireless communication, the code comprising instructions executable to:

obtain identification information for a device;

establish a connection with a wireless network based on a network credential of a user equipment (UE);

transmit to the wireless network the identification information for the device; and register the device for access to the wireless network under a subscription associated with the UE with a network credential for the device that is different from the network credential of the UE by associating the identification information for the device with the network credential of the UE.

62. The non-transitory computer-readable medium of claim 61, the instructions being further executable to:

establish a local communication link with the device, and obtain the identification information for the device over the local communication link.

63. The non-transitory computer-readable medium of claim 62, the instructions being further executable to:

send credentials for accessing the wireless network to the device over the local communication link.

64. The non-transitory computer-readable medium of claim 61, the instructions being further executable to:

authenticate the identification information for the device by the UE; and determine whether the device is allowed to be registered with the wireless network.

65. A non-transitory computer-readable medium storing code for wireless communication, the code comprising instructions executable to:

establish a connection with a user equipment (UE) over a local communication link;

receive credentials for accessing a wireless network from the UE over the local communication link, wherein the received credentials for accessing the wireless network are associated with a subscription of the UE, wherein the association with the subscription is based at least in part on an association between identification information of a device transmitted to the wireless network by the UE and a network credential of the UE, and wherein the received credentials are different from the network credential of the UE; and access the wireless network utilizing the received credentials.

* * * * *